US012460811B2

(12) United States Patent
Bang et al.

(10) Patent No.: US 12,460,811 B2
(45) Date of Patent: Nov. 4, 2025

(54) SPEAKER AND CONTROL METHOD THEREOF

(71) Applicant: SAMSUNG ELECTRONICS CO., LTD., Suwon-si (KR)

(72) Inventors: Sungil Bang, Suwon-si (KR); Junpyo Kim, Suwon-si (KR); Jigwang Kim, Suwon-si (KR); Jeewon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/950,979

(22) Filed: Nov. 18, 2024

(65) Prior Publication Data

US 2025/0075897 A1 Mar. 6, 2025

Related U.S. Application Data

(63) Continuation of application No. PCT/KR2022/009500, filed on Jul. 1, 2022.

(30) Foreign Application Priority Data

May 18, 2022 (KR) ........................ 10-2022-0061114

(51) Int. Cl.
*F21V 33/00* (2006.01)
*H04R 1/02* (2006.01)
(Continued)

(52) U.S. Cl.
CPC ......... *F21V 33/0056* (2013.01); *H04R 1/028* (2013.01); *F21Y 2113/00* (2013.01); *F21Y 2115/10* (2016.08)

(58) Field of Classification Search
CPC ............. F21V 33/0056; F21V 33/0052; F21V 33/0004; F21V 33/00; F21V 7/00;
(Continued)

(56) References Cited

U.S. PATENT DOCUMENTS

| | | | | |
|---|---|---|---|---|
| 9,453,627 | B1 * | 9/2016 | Chen | F21S 10/046 |
| 10,911,863 | B2 | 2/2021 | Trainer et al. | |

(Continued)

FOREIGN PATENT DOCUMENTS

| | | |
|---|---|---|
| CN | 205545855 U | 8/2016 |
| CN | 215420611 U | 1/2022 |

(Continued)

OTHER PUBLICATIONS

"Double 8 inch large Bluetooth speakers", retrieved on Feb. 11, 2022, 18 pages, https://ko.aliexpress.com/item/1005003032353540.htmlgatewayAdapt=glo2kor&aff_fcid=823a1d0242a642069.

(Continued)

*Primary Examiner* — Bao Q Truong
(74) *Attorney, Agent, or Firm* — Sughrue Mion, PLLC

(57) ABSTRACT

A speaker including: a sound outputter; a housing; a first LED array disposed in a vertical direction at a left end of a first side surface among a plurality of side surfaces comprised in the housing; a second LED array disposed in the vertical direction at a right end of the first side surface; a third LED array disposed in the vertical direction at a left end of a second side surface among the plurality of side surfaces; a fourth LED array disposed in the vertical direction at a right end of the second side surface; and at least one processor configured to: control the first LED array, the second LED array, the third LED array, and the fourth LED array based on a light emitting method corresponding to a mode of the speaker among a plurality of light emitting methods, and control the sound outputter to output sound.

15 Claims, 13 Drawing Sheets

(51) Int. Cl.
*F21Y 113/00* (2016.01)
*F21Y 115/10* (2016.01)

(58) Field of Classification Search
CPC ....... F21V 7/0083; H04R 1/028; H04R 1/023; H04R 1/02; H04R 1/00; F21Y 2115/10; F21Y 2113/00
See application file for complete search history.

(56) References Cited

U.S. PATENT DOCUMENTS

| | | | | |
|---|---|---|---|---|
| 2016/0295308 | A1* | 10/2016 | Battyanyi | H04R 1/26 |
| 2022/0386002 | A1* | 12/2022 | Cheng | H04R 1/028 |

FOREIGN PATENT DOCUMENTS

| | | | |
|---|---|---|---|
| JP | 2015-53550 | A | 3/2015 |
| JP | 2020-205239 | A | 12/2020 |
| KR | 10-0341726 | B1 | 6/2002 |
| KR | 10-2010-0001055 | A | 1/2010 |
| KR | 10-2011-0054972 | A | 5/2011 |
| KR | 10-1132217 | B1 | 4/2012 |
| KR | 10-2012-0121369 | A | 11/2012 |
| KR | 20-0468115 | Y1 | 7/2013 |
| KR | 10-1457588 | B1 | 11/2014 |
| KR | 10-1829259 | B1 | 3/2018 |
| WO | 2016/056806 | A1 | 4/2016 |

OTHER PUBLICATIONS

International Search Report (PCT/ISA/210) issued by the International Searching Authority on Feb. 8, 2023 in corresponding International Application No. PCT/KR2022/009500.

Written Opinion (PCT/ISA/237) issued by the International Searching Authority on Feb. 8, 2023 in corresponding International Application No. PCT/KR2022/009500.

* cited by examiner

SPEAKER AND CONTROL METHOD THEREOF

CROSS-REFERENCE TO RELATED APPLICATION

This application is a continuation of International Application No. PCT/KR2022/009500, filed on Jul. 1, 2022, in the Korean Intellectual Property Receiving Office, which is based on and claims priority to Korean Patent Application No. 10-2022-0061114, filed on May 18, 2022, in the Korean Intellectual Property Office, the disclosures of which are incorporated by reference herein in their entireties.

BACKGROUND

1. Field

The disclosure relates to a speaker and a control method thereof, and more particularly, to a speaker that provides sound output from the speaker and visual effects corresponding to the sound together therewith by controlling a plurality of light source arrays included in the speaker and a control method thereof.

2. Description of Related Art

As use of smart phones increase, use of electronic devices that work in association with the smart phones have also increased. For example, a Bluetooth speaker which is connected with a smart phone, and is configured to output music, call voice, and the like received from the smart phone corresponds to the above.

Recently, to increase use of the speaker as described, in addition to a function of outputting an original sound of the speaker, a product which provides a visual effect such as lighting function together therewith is also being released. However, in the case of the speaker described above, because a component for emitting light such as a light emitting module has to be added, production cost may increase and it may be disadvantageous compared to other speakers in terms of price competitiveness. Accordingly, for an appropriate production cost, there is a need for a speaker which can maximize the lighting effect with just a small number of light emitting modules.

In addition, as products mounted with lighting function have become more diversified, now, rather than simply emitting light, various light emitting methods are performed according to music or an operating mode of the speaker, and there are increasing demands by the users for products that can enhance a sense of engagement of users.

SUMMARY

The disclosure has been devised to according to the above-described necessity, and an object of the disclosure lies in providing a speaker which provides a visual effect associated with a type of sound being output from the speaker by controlling LED arrays according to a light emitting method that corresponds to a mode of the speaker, and more effectively provides a visual effect by reflecting light being emitted from a light source through patterns formed at a side surface, and in providing a control method thereof.

Additional aspects will be set forth in part in the description which follows and, in part, will be apparent from the description, or may be learned by practice of the presented embodiments.

According to an aspect of the disclosure, a speaker may include: a sound outputter; a housing; a first LED array disposed in a vertical direction at a left end of a first side surface among a plurality of side surfaces comprised in the housing; a second LED array disposed in the vertical direction at a right end of the first side surface; a third LED array disposed in the vertical direction at a left end of a second side surface among the plurality of side surfaces; a fourth LED array disposed in the vertical direction at a right end of the second side surface; and at least one processor configured to: control the first LED array, the second LED array, the third LED array, and the fourth LED array based on a light emitting method corresponding to a mode of the speaker among a plurality of light emitting methods, and control the sound outputter to output sound, where the first side surface is formed with a protrusion pattern for reflecting light emitted from the first LED array and the second LED array, and where the second side surface is formed with a protrusion pattern for reflecting light emitted from the third LED array and the fourth LED array.

The at least one processor may be further configured to: based on the speaker being turned-on by a user input, control the first LED array, the second LED array, the third LED array, and the fourth LED array to emit based on a first light emitting method corresponding to a first mode, where the first light emitting method is a light emitting method in which a plurality of LED modules included in each of the first LED array, the second LED array, the third LED array, and the fourth LED array are sequentially turned-on from LED modules disposed at a center to LED modules disposed at both ends based on a first speed, and are then turned-off, and based on the plurality of LED modules being turned-off, the plurality of LED modules are sequentially turned-on from the LED modules disposed at the center to the LED modules disposed at the both ends based on a second speed, are then turned-off, and the light emitting method is repeated, and where the first speed is faster than the second speed.

The at least one processor may be further configured to: based on a user input for setting the mode of the speaker to a second mode being received while the speaker is in the first mode, control the first LED array, the second LED array, the third LED array, and the fourth LED array to emit based on a second light emitting method corresponding to the second mode, and where the second light emitting method is a light emitting method in which the plurality of LED modules included in each of the first LED array, the second LED array, the third LED array, and the fourth LED array are sequentially turned-on from the LED modules disposed at the center to the LED modules disposed at the both ends based on the first speed, and based on the plurality of LED modules all being turned-on, the plurality of LED modules are then all turned-off, and the light emitting method is repeated.

The at least one processor may be further configured to: based on a user input for setting the mode of the speaker to a third mode being received while the speaker is in the first mode, control the first LED array, the second LED array, the third LED array, and the fourth LED array to emit based on a third light emitting method corresponding to the third mode, and where the third light emitting method is a light emitting method in which the plurality of LED modules included in each of the first LED array, the second LED array, the third LED array, and the fourth LED array are sequentially turned-on from LED modules disposed at a first end to LED modules disposed at a second end based on the first speed, are then turned-off, and the light emitting method is repeated.

The at least one processor may be further configured to: based on a user input for setting the mode of the speaker to a fourth mode being received while the speaker is in the first mode, control the first LED array, the second LED array, the third LED array, and the fourth LED array to emit based on a fourth light emitting method corresponding to the fourth mode, and where the fourth light emitting method is a light emitting method in which the plurality of LED modules included in each of the first LED array, the second LED array, the third LED array, and the fourth LED array are simultaneously turned-on, are then simultaneously turned-off, and the light emitting method is repeated.

The at least one processor may be further configured to: based on a user input for setting the mode of the speaker to a fifth mode being received while the speaker is in the first mode, control the first LED array, the second LED array, the third LED array, and the fourth LED array to emit based on a fifth light emitting method corresponding to the fifth mode, and where the fifth light emitting method is a light emitting method in which the first LED array, the second LED array, the third LED array, and the fourth LED array are sequentially turned-on, are then turned-off, and the light emitting method is repeated.

The at least one processor may be further configured to: based on a user input for setting the mode of the speaker to a sixth mode being received while the speaker is in the first mode, emit the first LED array, the second LED array, the third LED array, and the fourth LED array based on a sixth light emitting method corresponding to the sixth mode, and where the sixth light emitting method is a light emitting method in which the second LED array and the fourth LED array are turned-on when the first and third LED arrays are turned-on, are then turned-off, and the light emitting method is repeated.

The speaker may further include a microphone, where the at least one processor is further configured to: based on a sound obtained through the microphone, identify a BPM of the sound, identify a period time based on the identified BPM, and control the first LED array, the second LED array, the third LED array, and the fourth LED array to repeatedly emit based on a light emitting method corresponding to the mode of the speaker according to the identified period time.

According to an aspect of the disclosure, a method for controlling a speaker, where the speaker includes: a sound outputter; a housing; a first LED array disposed in a vertical direction at a left end of a first side surface among a plurality of side surfaces included the housing; a second LED array disposed in the vertical direction at a right end of the first side surface; a third LED array disposed in the vertical direction at a left end of a second side surface among the plurality of side surfaces; and a fourth LED array disposed in the vertical direction at a right end of the second side surface, where the first side surface is formed with a protrusion pattern for reflecting light emitted from the first LED array and the second LED array, and where the second side surface is formed with a protrusion pattern for reflecting light emitted from the third LED array and the fourth LED array, the method may include: emitting the first LED array, the second LED array, the third LED array, and the fourth LED array based on a light emitting method corresponding to a mode of the speaker from among a plurality of light emitting methods; and outputting sound through the sound outputter.

The emitting may include: based on the speaker being turned-on by a user input, emitting the first LED array, the second LED array, the third LED array, and the fourth LED array based on a first light emitting method corresponding to a first mode, where the first light emitting method is a light emitting method in which a plurality of LED modules included in each of the first LED array, the second LED array, the third LED array, and the fourth LED array are sequentially turned-on from LED modules disposed at a center to LED modules disposed at both ends based on a first speed, and are then turned-off, and based on the plurality of LED modules being turned-off, the plurality of LED modules are sequentially turned-on from the LED modules disposed at the center to the LED modules disposed at the both ends based on a second speed, are then turned-off, and the light emitting method is repeated, and where the first speed is faster than the second speed.

The emitting may further include: based on a user input for setting the mode of the speaker to a second mode being received while the speaker is in the first mode, emitting the first LED array, the second LED array, the third LED array, and the fourth LED array based on a second light emitting method corresponding to the second mode, and where the second light emitting method is a light emitting method in which the plurality of LED modules included in each of the first LED array, the second LED array, the third LED array, and the fourth LED array are sequentially turned-on from the LED modules disposed at the center to the LED modules disposed at the both ends based on the first speed, and based on the plurality of LED modules all being turned-on, the plurality of LED modules are then all turned-off, and the light emitting method is repeated.

The emitting may further include: based on a user input for setting the mode of the speaker to a third mode being received while the speaker is in the first mode, emitting the first LED array, the second LED array, the third LED array, and the fourth LED array based on a third light emitting method corresponding to the third mode, and where the third light emitting method is a light emitting method in which the plurality of LED modules included in each of the first LED array, the second LED array, the third LED array, and the fourth LED array are sequentially turned-on from LED modules disposed at a first end to LED modules disposed at a second end based on the first speed, are then turned-off, and the light emitting method is repeated.

The emitting may further include: based on a user input for setting the mode of the speaker to a fourth mode being received while the speaker is in the first mode, emitting the first LED array, the second LED array, the third LED array, and the fourth LED array based on a fourth light emitting method corresponding to the fourth mode, and where the fourth light emitting method is a light emitting method in which the plurality of LED modules included in each of the first LED array, the second LED array, the third LED array, and the fourth LED array are simultaneously turned-on, are then simultaneously turned-off, and the light emitting method is repeated.

The emitting further may further include: based on a user input for setting the mode of the speaker to a fifth mode being received while the speaker is in the first mode, emitting the first LED array, the second LED array, the third LED array, and the fourth LED array based on a fifth light emitting method corresponding to the fifth mode, and where the fifth light emitting method is a light emitting method in which the first LED array, the second LED array, the third LED array, and the fourth LED array are sequentially turned-on, are then turned-off, and the light emitting method is repeated.

The emitting may further include: based on a user input for setting the mode of the speaker to a sixth mode being received while the speaker is in the first mode, emitting the first LED array, the second LED array, the third LED array, and the fourth LED array based on a sixth light emitting method corresponding to the sixth mode, and where the sixth light emitting method is a light emitting method in which the second LED array and the fourth LED array are turned-on when the first LED array and the third LED array are turned-on, are then turned-off, and the light emitting method is repeated.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Terms used in describing embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have", "may have", "include", and "may include" are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B".

Expressions such as "1st", "2nd", "first" or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used herein perform at least one function or operation, and may be implemented with hardware or software, or implemented with a combination of hardware and software. In addition, a plurality of "modules" or a plurality of "parts," excluding a "module" or a "part" which needs to be implemented to a specific hardware, may be integrated in at least one module and implemented as at least one processor.

In the disclosure, the term 'user' may mean a person who receives sound through a speaker, but is not limited thereto.

Figure 1:
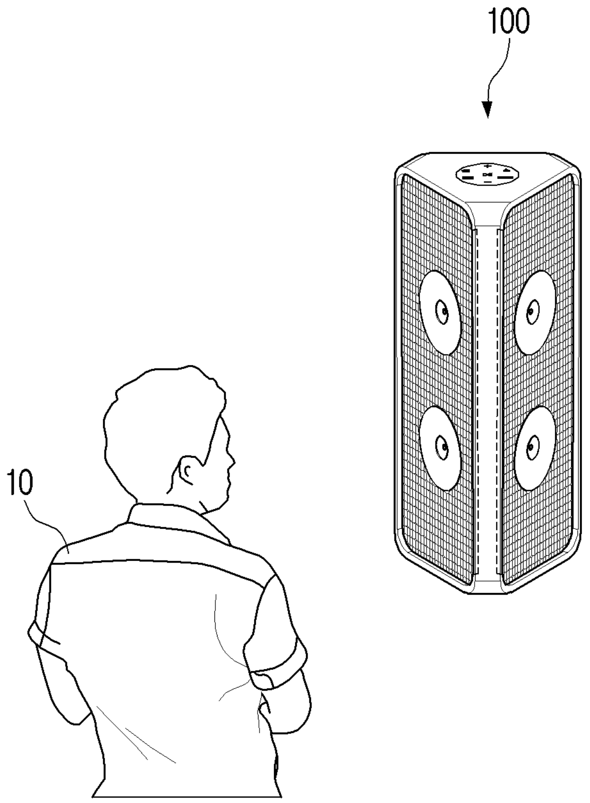
FIG. 1 is a diagram schematically illustrating a speaker that reflects light being emitted from a light source array using protrusion patterns according to an embodiment of the disclosure.

FIG. 1 is a diagram schematically illustrating a speaker that reflects light being emitted from a light source array using protrusion patterns.

Referring to FIG. 1, a speaker 100 may provide sound to a user 10. Specifically, the speaker 100 may output sound corresponding to sound information based on sound information stored in the speaker 100 or sound information included in an audio signal received from a user terminal device. At this time, the sound output from the speaker 100 may include music, a call voice of the user, mechanical sounds, and the like.

The speaker 100 according to an embodiment of the disclosure may perform not only a function of outputting sound, but also a lighting function together therewith using light emitting modules included in the speaker 100. Specifically, the speaker 100 may include a plurality of light emitting diode arrays (LED arrays) which include a plurality of light emitting modules. Further, light may be emitted from the plurality of LED arrays, and light may be provided to the user.

At this time, according to an embodiment of the disclosure, light emitted from the plurality of light emitting modules of the speaker 100 may be reflected through a protrusion pattern included at a side surface of the speaker 100. Through the above, the speaker 100 may provide, to the user, not only direct lighting using light emitted from a light emitting module, but also indirect lighting using light reflected by the protrusion pattern together therewith. Accordingly, the speaker 100 herein may more effectively perform a lighting function when compared with another speaker which includes a same number of light emitting modules.

In addition, according to an embodiment of the disclosure, the speaker 100 may apply a light emitting method of an LED array differently according to an operating mode of the speaker 100. At this time, the operating mode may be set according to a sound type output from the speaker 100. Further, the speaker 100 may emit light in a light emitting method corresponding to the sound type provided to the user. Accordingly, the user may be provided with a visual effect associated with the sound from the speaker 100. The above may lead to an effect of enhancing a sense of engagement by the user by providing lighting that matches with an event, a mood, or the like desired by the user.

An embodiment of the speaker of the disclosure which emits light in various light methods according to modes due to including the plurality of LED arrays will be described in greater detail below.

Figure 2:
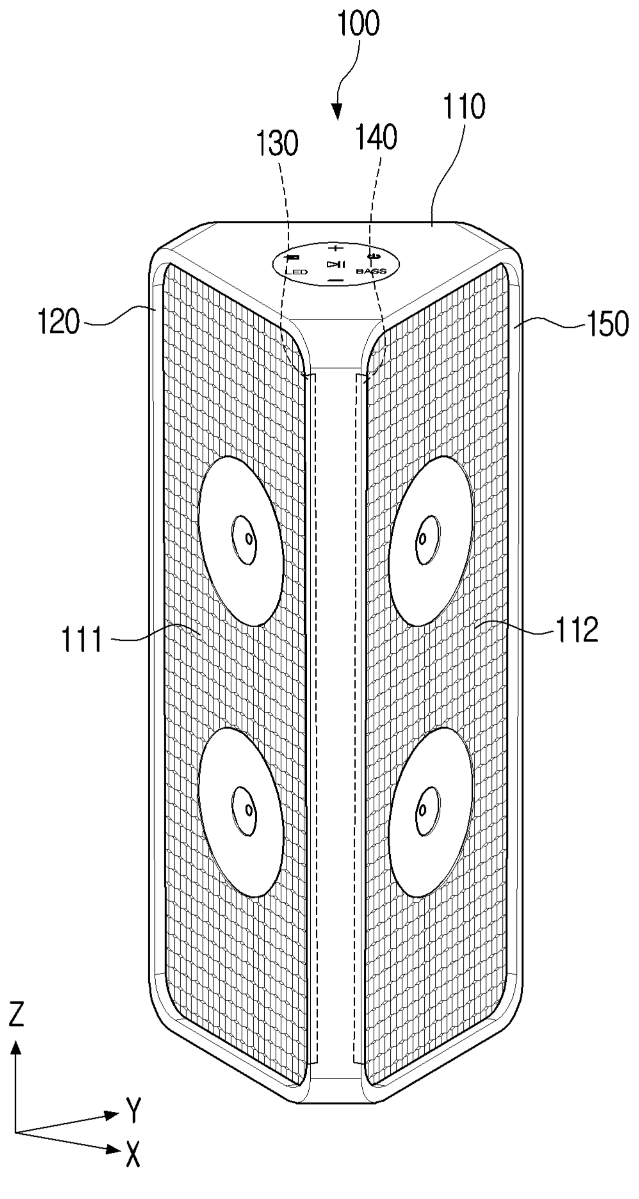
FIG. 2 is a perspective view of a speaker according to an embodiment of the disclosure.
Figure 3:
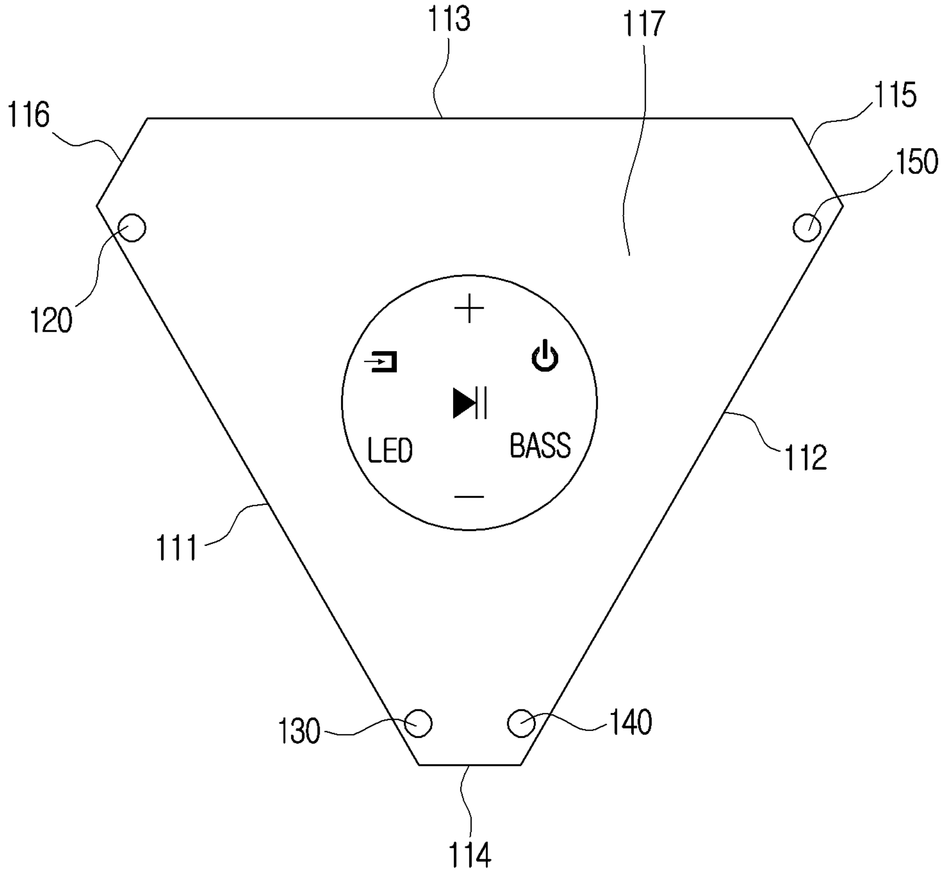
FIG. 3 is a plane view viewed from an upper part of a speaker according to an embodiment of the disclosure.

FIG. 2 is a perspective view of a speaker according to an embodiment of the disclosure, and FIG. 3 is a plane view viewed from an upper part of a speaker according to an embodiment of the disclosure.

Referring to FIG. 2, the speaker 100 may include a housing 110, a first LED array 120, a second LED array 130, a third LED array 140, and a fourth LED array 150.

The housing 110 may form an exterior of the speaker 100, and may be in a form of a hexagonal pillar. At this time, referring to FIG. 2 and FIG. 3, the housing 110 may include a plurality of side surfaces 111 to 116. The plurality of side surfaces 111 to 116 of the housing 110 may connect an upper surface 117 and a lower surface 118 of the housing 110, and perform a role of a stand which supports the speaker 100. To this end, a vertical length of the plurality of side surfaces 111 to 116 included in the housing 110 may be the same. Meanwhile, the housing 110 according to an embodiment may form exteriors of various shapes which include the plurality of side surfaces such as, for example, and without limitation, a triangular pillar, a quadrangular pillar, a pentagonal pillar, and the like.

Referring to FIG. 2 and FIG. 3, horizontal lengths of a first side surface 111, a second side surface 112, and a third side surface 113 from among the plurality of side surfaces 111 to 116 included in the housing 110 may be formed the same. Further, horizontal lengths of a fourth side surface 114, a fifth side surface 115, and a sixth side surface 116 from among the plurality of side surfaces 111 to 116 included in the housing 110 may be formed the same. At this time, the horizontal lengths of the first to third side surfaces 111 to 113 may be formed longer than the horizontal lengths of the fourth to sixth side surfaces 114 to 116. Accordingly, the first to third side surfaces 111 to 113 may have a wider area than the fourth to sixth side surfaces 114 to 116.

In addition, referring to FIG. 3, the fourth side surface 114 may be formed to connect the first side surface 111 an the second side surface 112, the fifth side surface 115 may be formed to connect the second side surface 112 and the third side surface 113, and the sixth side surface 116 may be formed to connect the third side surface 113 and the first side surface 111.

Meanwhile, at the first side surface 111, the first LED array 120 and the second LED array 130 may be disposed. Specifically, the first LED array 120 may be disposed in a vertical direction at a left end of the first side surface 111, and the second LED array 130 may be disposed in a vertical direction at a right end of the first side surface 111.

Specifically, the first LED array 120 may be disposed on a left edge area of the first side surface 111 in the vertical direction of the housing 110. At this time, the left edge area may be an area of a pre-set width which includes a left edge surface of the first side surface 111. In addition, the second LED array 130 may be disposed on a right edge area of the first side surface 111 in the vertical direction of the housing 110. At this time, the right edge area may be an area of a pre-set width which includes a right edge surface of the first side surface 111.

Meanwhile, the third LED array 140 and the fourth LED array 150 may be disposed at the second side surface 112. Specifically, the third LED array 140 may be disposed in a vertical direction at a left end of the second side surface 112, and the fourth LED array 150 may be disposed in a vertical direction at a right end of the second side surface 112.

Specifically, the third LED array 140 may be disposed on a left edge area of the second side surface 112 in the vertical direction of the housing 110. The left edge area may be an area of a pre-set width which includes a left edge surface of the second side surface 112. In addition, the fourth LED array 150 may be disposed on a right edge area of the second side surface 112 in the vertical direction of the housing 110. At this time, the right edge area may be an area of a pre-set width which includes a right edge surface of the second side surface 112.

Meanwhile, the first to second side surfaces 111 and 112 may further include a radiation hole which radiates sound output from the speaker 100. The sound output from the speaker through the radiation hole may be radiated in a direction to which each of the side surfaces (the first to second side surfaces) face. The radiation hole may be in a circular mesh form. However, the above is not limited thereto.

According to an embodiment of the disclosure, the LED arrays may not be disposed at the third side surface 113, and a charging connector, an input interface, or the like may be disposed in the speaker 100. However, the above is not limited thereto, and the third side surface 113 may also be disposed with the plurality of LED arrays like the first and second side surfaces 111 and 112. That is, a fifth LED array may be disposed in a vertical direction at a left end of the third side surface 113, and a sixth LED array may be disposed in a vertical direction at a right end of the third side surface 113.

The LED array disposed at a side surface of the speaker and the protrusion pattern formed at the side surface will be described in detail below with reference to FIG. 4.

Figure 4:
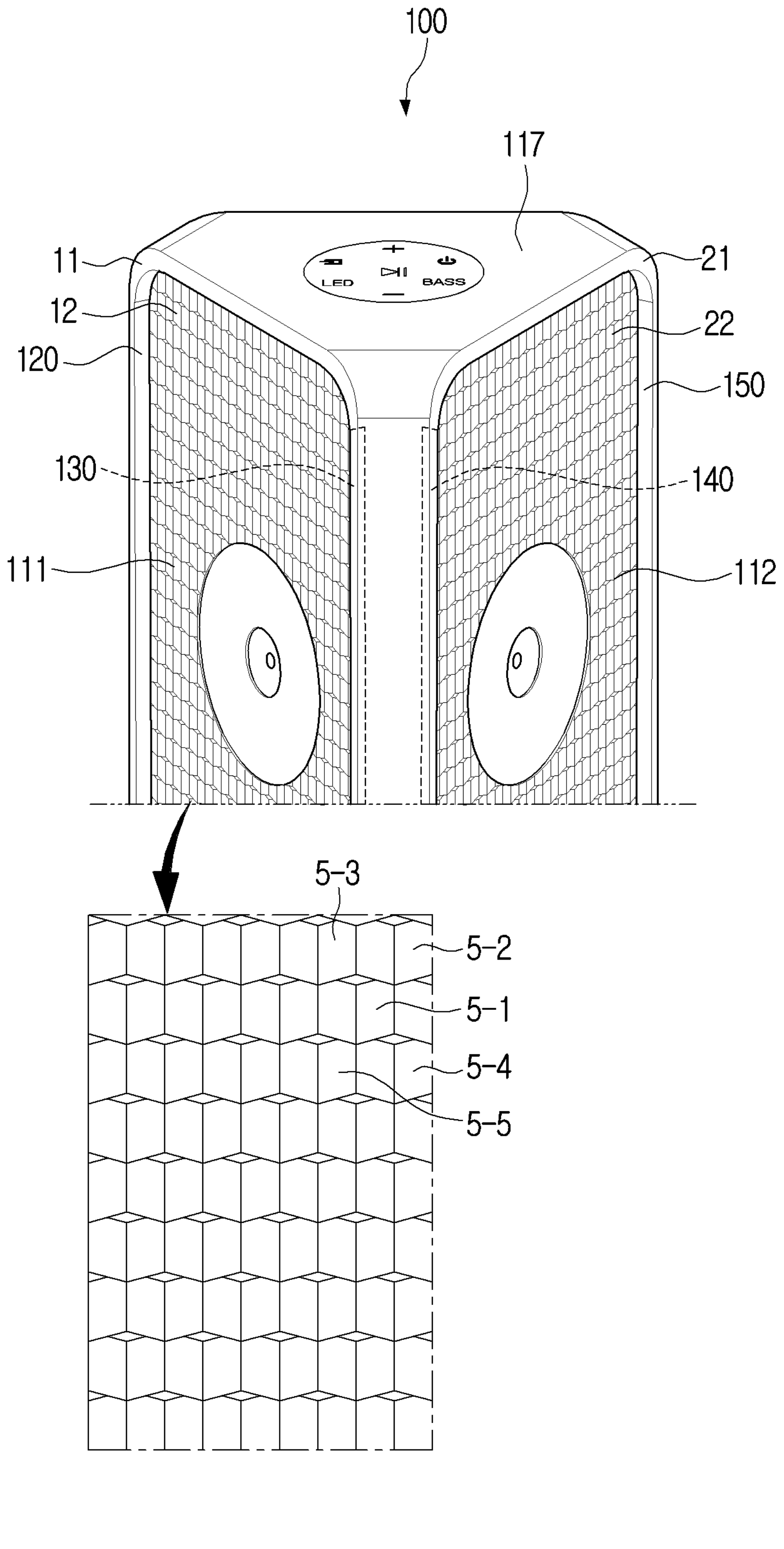
FIG. 4 is an enlarged view illustrating a speaker according to an embodiment of the disclosure.

FIG. 4 is an enlarged view illustrating a speaker according to an embodiment of the disclosure.

Referring to FIG. 4, protrusion patterns may be formed on the first side surface 111 and the second side surface 112. Specifically, at the first side surface 111, a protrusion pattern for reflecting light emitted from the first and second LED arrays 120 to 130 may be formed, and at the second side surface 112, a protrusion pattern for reflecting light emitted from the third and fourth LED arrays 140 to 150 may be formed. The speaker 100 may reflect, using the protrusion patterns formed at each of the first side surface 111 and the second side surface 112, light emitted from the first to fourth LED arrays 120 to 150. Through the above, the speaker 100 of the disclosure may provide the user with not only a direct lighting effect using light emitted from the first to fourth LED arrays 120 to 150, but also an indirect lighting effect using light reflected by the protrusion patterns.

Meanwhile, referring to FIG. 4, the protrusion patterns formed at the first side surface 111 and the second side surface 112 may be implemented by protruding parts 5 which are protruded outwards forming a plurality of columns. Specifically, at each of the plurality of columns, a plurality of protruding parts which are protruded outwards may be repeatedly disposed. At this time, a protruding part 5-1 may be disposed at each of the columns so as to be deviated from the protruding parts 5-2 to 5-5 disposed vertically at adjacent columns.

Meanwhile, the first side surface 111 and the second side surface 112 may further include frames 11 and 21. Specifically, referring to FIG. 3, the first side surface 111 may be implemented as a first pattern surface 12 formed with a protrusion pattern and a first edge frame 11 surrounding the first pattern surface which is protruded more outwards than the first pattern surface.

Specifically, a groove may be formed on the first side surface 111 by the first edge frame 11, and the first side surface 111 may be implemented according to the first pattern surface 12 being disposed at the formed groove. At this time, the first LED array 120 and the second LED array 130 disposed at the first side surface 111 may be respectively disposed at an inner side surface of the first edge frame 11 facing each other. Specifically, the first LED array 120 may be disposed at an inner side surface of a left side of the first edge frame 11, and the second LED array 130 may be disposed at an inner side surface of a right side of the first edge frame 11.

In addition, the second side surface 112 may be implemented with a second pattern surface 22 formed with a protrusion pattern and a second edge frame 21 surrounding the second pattern surface which is protruded more outwards than the second pattern surface.

Specifically, a groove may be formed on the second side surface 112 by the second edge frame 21, and the second side surface 112 may be implemented according to the second pattern surface 22 being disposed at the formed groove. At this time, the third LED array 140 and the fourth LED array 150 disposed at the second side surface 112 may be respectively disposed at the inner side surfaces facing each other in the second edge frame 21. Specifically, the third LED array 140 may be disposed at an inner side surface at a left side of the second edge frame 21, and the fourth LED array 150 may be disposed at an inner side surface at a right side of the second edge frame 21.

Meanwhile, according to an embodiment of the disclosure, the third side surface 113 may also be formed with a protrusion pattern.

Meanwhile, according to an embodiment of the disclosure, the protrusion patterns may be implemented with a high impact polystyrene (HIPS) material. That is, a protrusion pattern surface implemented with the HIPS material may be attached to each of the side surfaces (first side surface and second side surface) and implemented as each of the pattern surfaces (first pattern surface and second pattern surface).

Figure 5:
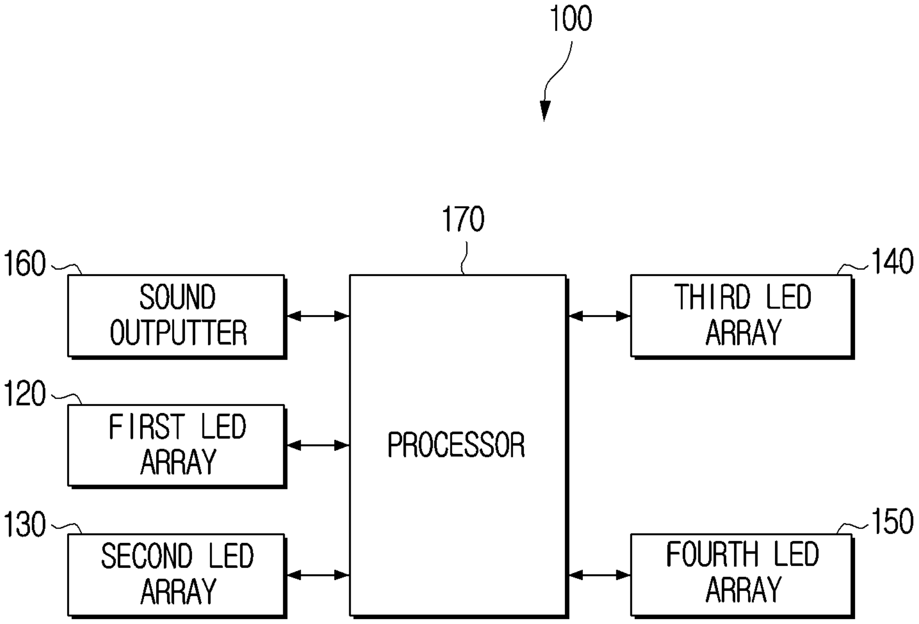
FIG. 5 is a perspective view schematically illustrating a speaker according to an embodiment of the disclosure.

FIG. 5 is a perspective view schematically illustrating a speaker according to an embodiment of the disclosure.

Referring to FIG. 5, the speaker 100 may include the housing 110, the first LED array 120, the second LED array 130, the third LED array 140, the fourth LED array 150, a sound outputter 160, and a processor 170.

Because the housing 110 according to an embodiment of the disclosure has been described in detail with reference to FIG. 2 to FIG. 4, detailed descriptions thereof will be omitted.

The first LED array 120 may include a plurality of LED modules. Specifically, the plurality of LED modules may be disposed in one line in the first LED array 120, and the first LED array 120 may output, using the at least one LED module from among the plurality of LED modules, light corresponding to an image data.

Here, the image data may be color information or a brightness value of light emitted from the plurality of LED modules included in the first LED array 120.

Meanwhile, according to an embodiment of the disclosure, a light emitting device of the speaker 100 has been described as an LED array and a plurality of light emitting diode (LED) modules included in the LED array, but is not limited thereto. That is, the light emitting device of the speaker 100 may be implemented as a cold cathode fluorescent lamp (CCFL), a micro light emitting diode (micro LED) module, or the like.

Meanwhile, according to an embodiment of the disclosure, the first LED array 120 may include at least one from among a RED LED module, a GREEN LED module, or a BLUE LED module. Specifically, at each of a plurality of columns of the first LED array 120, one RED LED module, one GREEN LED module, and one BLUE LED module may be disposed. Through the above, the first LED array 120 may output light of various colors.

More specifically, the processor 170 may output light of various colors by applying driving current to at least one from among the RED LED module, the GREEN LED module, or the BLUE LED module based on image data. For example, assuming that the image data is data set to emit light of a red color, the processor 170 may apply driving current to only the RED LED module from among the RED LED module, the GREEN LED module, and the BLUE LED module disposed at each of the plurality of columns of the first LED array 120. Accordingly, only the RED module may be turned-on. Further, light of a red color may be output from the first LED array 120. Meanwhile, the color output from the first LED array 120 may not be a single color, but in a form combined with a plurality of colors.

Meanwhile, the first LED array 120 may further include a cover part which covers the plurality of LED modules disposed in the first LED array 120. At this time, the cover part may be implemented with a polymethyl methacrylate (PMMA) material film, and the like. The cover part may protect the plurality of LED modules by being disposed at an upper part of the plurality of LED modules, and adjust a direction of light emitted from the plurality of LED modules.

Meanwhile, the first LED array 120 may further include a substrate on which the plurality of LED modules is disposed and a cooling module for cooling heat generated when driving the plurality of LED modules.

Because the description relating to the first LED array 120 described above may be identically applied for the second to fourth LED arrays 130 to 150, detailed descriptions thereof will be omitted.

According to an embodiment of the disclosure, the sound outputter 160 may output various sounds corresponding to an audio signal. Specifically, the sound outputter 160 may perform signal processing such as audio decoding for audio signals stored in the speaker 100 or received from an external device (e.g., a user terminal device) connected with the speaker 100. Further, the sound outputter 160 may apply power corresponding to the audio signal to a coil. Further, when coil to which power is applied is vibrated, the sound outputter 160 may output sound corresponding to the audio signal. Through the above, the sound outputter 160 may output various sounds such as, for example, and without limitation, music, mechanical sounds, call voices, and the like.

According to an embodiment of the disclosure, the processor 170 may control an overall operation of the speaker 100. Specifically, the processor 170 may control the overall operation of the speaker 100 by being connected with each configuration of the speaker. Specifically, the processor 170 may be connected with the sound outputter 160, and output sounds corresponding to sound information stored in the speaker 100. Alternatively, the processor 170 may output light by being connected with the first to fourth LED arrays 120 to 150.

According to an embodiment, the processor 170 may be designated as various names such as, for example, and without limitation, a digital signal processor (DSP), a microprocessor, a central processing unit (CPU), a micro controller unit (MCU), a micro processing unit (MPU), a neural processing unit (NPU), a controller, an application processor (AP), and the like, but in the disclosure, the above will be described as the processor 170.

The processor 170 may be implemented as a system on chip (SoC) or a large scale integration (LSI), or implemented in a form of a field programmable gate array (FPGA). In addition, the processor 170 may include a volatile memory such as an SRAM.

A method of the processor 170 driving a plurality of LEDs included in each of the first to fourth LED arrays 120 to 150 will be described below.

The processor 170 may emit the first to fourth LED arrays 120 to 150. Specifically, the processor 170 may identify a light emitting method corresponding to a mode of the speaker 100, and obtain image data corresponding to the identified light emitting method from a memory. Further, the processor 170 may control, based on the image data, the driving current to adjust brightness of the plurality of LED modules included in each of the first to fourth LED arrays 120 to 150.

Specifically, the processor 170 may adjust at least one from among a supply time and intensity of the driving current (or driving voltage) applied to the plurality of LED modules included in the first to fourth LED arrays 120 to 150 according to features of the image data. Alternatively, the processor 170 may identify one area to output light on the first to fourth LED arrays 120 to 150 according to the features of the image data. Further, the processor 170 may provide a dimming effect by applying driving current to only the plurality of LED modules included in the identified one area to be turned-on.

At this time, the processor 170 may control brightness of each of the LED modules included in the first to fourth LED arrays 120 to 150 with a pulse width modulation (PWM) in which a duty ratio is varied. Alternatively, the processor 170 may control brightness of each of the LED modules included in the first to fourth LED arrays 120 to 150 by varying current intensity.

Here, a pulse width modulation (PWM) signal may be a signal which controls a ratio of each of the plurality of LED modules being turned-on and turned-off. Meanwhile, the duty ratio (%) may be determined according to a dimming value based on the image data corresponding to each of the light emitting methods.

Meanwhile, the processor 170 may be implemented in a form which includes a plurality of driver ICs for driving the plurality of LED modules included in the first to fourth LED arrays 120 to 150. More specifically, the processor 170 may include a first driver IC for driving the first LED array 120, a second driver IC for driving the second LED array 130, a third driver IC for driving the third LED array 140, and a fourth driver IC for driving the fourth LED array 150. At this time, the processor 170 may be implemented with a digital driver IC and one chip when implemented as a DSP.

However, the above is not limited thereto, and each of the first to fourth driver ICs may be implemented in hardware separate from the processor 170 and include in the speaker 100. For example, the first to fourth driver ICs may be implemented as an LED driver configured to control current applied to the plurality of LED modules included in each of the first to fourth LED arrays 120 to 150.

An embodiment of the disclosure which applies a light emitting method according to a mode of the speaker 100 differently based on a driving method of the processor 170 for the plurality of LED modules included in each of the first to fourth LED arrays 120 to 150 described above will be described below.

According to an embodiment of the disclosure, the processor 170 may emit the first to fourth LED arrays 120 to 150 based on a light emitting method corresponding to a mode of the speaker 100 from among the plurality of light emitting methods, and output sound through the sound outputter 160.

Specifically, the processor 170 may receive an instruction on a mode setting from the user through the input interface. Here, the mode may indicate a driving type of the speaker 100, and may relate to, for example, a driving method for the plurality of LED arrays (e.g., the light emitting method of the first to fourth LED arrays 120 to 150) included in the speaker 100. At this time, the mode for the speaker 100 may be in plurality, and each of a plurality of modes may be set to correspond to each of a plurality of driving types of the speaker 100.

Meanwhile, the light emitting method of the speaker 100 may be set differently according to the driving type of the speaker 100. Accordingly, the processor 170 may identify a mode corresponding to the driving type of the speaker 100, and identify the light emitting method corresponding to the identified mode.

Further, the processor 170 may drive the plurality of LED modules included in each of the first to fourth LED arrays 120 to 150 based on the identified light emitting method. Specifically, image data corresponding to the identified light emitting method may be identified. At this time, the image data may be stored in the memory of the processor 170. Further, the processor 170 may apply, based on the image data, driving current to the plurality of LEDs included in each of the first to fourth LED arrays 120 to 150.

At this time, the processor 170 may apply driving current to the plurality of LEDs included in each of the first to fourth LED arrays 120 to 150 according to a local dimming method. Specifically, the processor 170 may divide the plurality of LED modules included in each of the first to fourth LED arrays 120 to 150 into a pre-set number.

For example, it may be assumed that thirty LED modules are disposed at each of the first to fourth LED arrays 120 to 150. The processor 170 may divide each of the first to fourth LED arrays 120 to 150 into ten blocks. At this time, in each of the ten blocks, three LED modules may be included. Further, the processor 170 may apply driving current to the plurality of LED modules in each block unit. As described above, the processor 170 may turn-on or turn-off the plurality of LED modules include in each of the first to fourth LED arrays 120 to 150 according to the local dimming method. Alternatively, the processor 170 may adjust color and a brightness value of light emitted from the plurality of LED modules included in each of the first to fourth LED arrays 120 to 150 according to the local dimming method.

Meanwhile, the processor 170 may output sound through the sound outputter 160 after emitting the first to fourth LED arrays 120 to 150 based on the identified light emitting method. Specifically, the processor 170 may output sound corresponding to an audio signal stored in the speaker 100 or an audio signal received from the external device (e.g., the user terminal device) connected with the speaker 100 through the sound outputter 160.

Meanwhile, according to an embodiment of the disclosure, the processor 170 may emit, based on the speaker 100 being turned-on based on a user input, the first to fourth LED arrays 120 to 150 based on a first light emitting method corresponding to a first mode.

Specifically, the processor 170 may receive an instruction for turning-on the speaker 100 while the speaker is in a turned-off state. At this time, the instruction may be received through an input interface disposed at one side surface of the housing 110 of the speaker 100. For example, the input interface may include a button for turning-on power of the speaker 100. Further, when the processor 170 detects an operation of the button for turning-on power, power may be applied to the speaker 100, and the speaker 100 may be turned-on. At this time, power applied to the speaker 100 may be output by a power supplying part.

Further, the processor 170 may identify, based on the speaker 100 being turned-on, the operating mode of the speaker as the first mode. Here, the first mode may be a standby mode for receiving a next control command of the user after the speaker 100 has been turned-on.

Meanwhile, the processor 170 may emit the first to fourth LED arrays 120 to 150 based on the first light emitting method corresponding to the first mode when the speaker 100 is turned-on. At this time, the first light emitting method may be a light emitting method by which a process wherein the plurality of LED modules included in each of the first to fourth LED arrays 120 to 150 are sequentially turned-on from LED modules disposed at a center to LED modules disposed at both ends based on a first speed and are then turned-off, and when the plurality of LED modules are turned-off, the plurality of LED modules are sequentially turned-on from LED modules disposed at the center to LED modules disposed at both ends based on a second speed are then turned-off is repeated.

Figure 6:
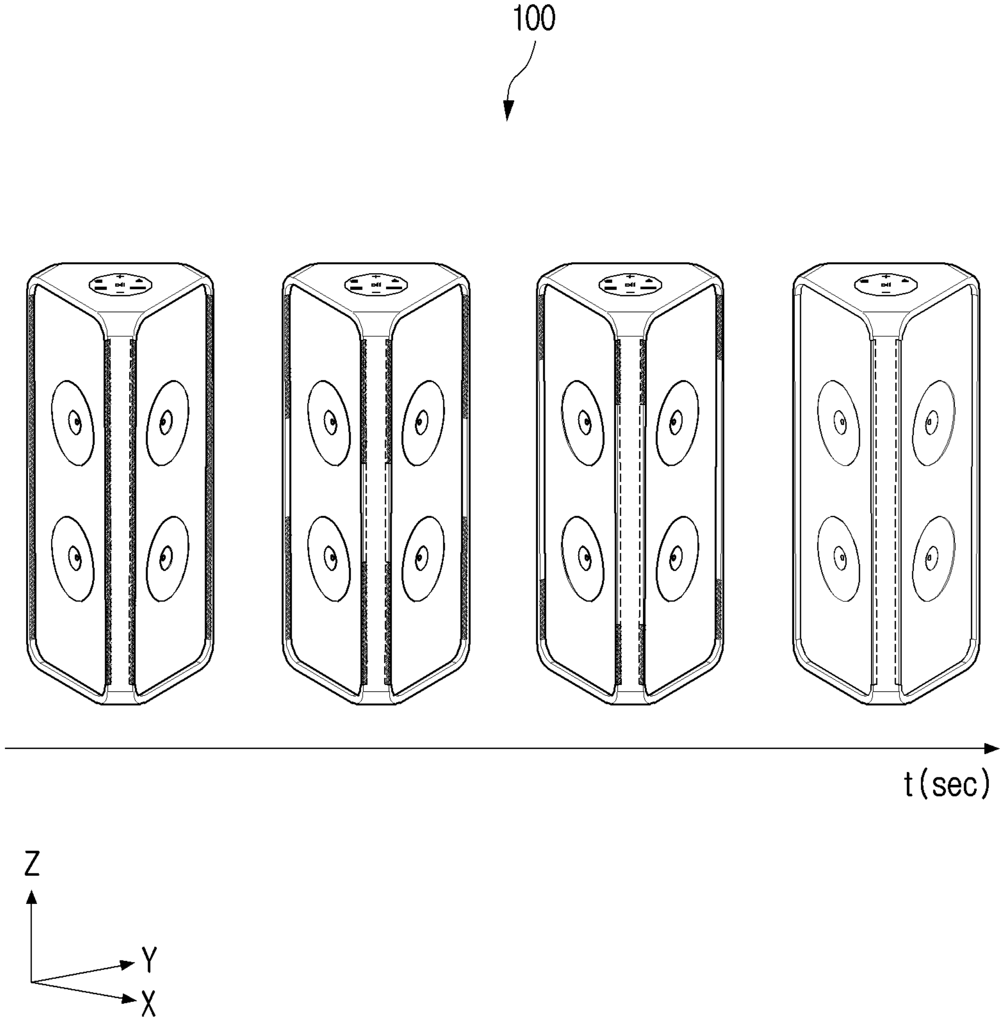
FIG. 6 is an example diagram illustrating a first light emitting method according to an embodiment of the disclosure.

FIG. 6 is an example diagram illustrating a first light emitting method according to an embodiment of the disclosure.

Referring to FIG. 6, the processor 170 may first apply driving current to the LED module disposed at the center included in each of the first to fourth LED arrays 120 to 150. Here, the LED module disposed at the center may include at least one LED module. At this time, a number of LED modules disposed at the center emitted from each of the first to fourth LED arrays 120 to 150 may be the same. For example, assuming that thirty LED modules have been disposed at each of the first to fourth LED arrays 120 to 150, the processor 170 may preferentially apply driving current to the three LED modules disposed at the center of the first to fourth LED arrays 120 to 150.

Meanwhile, referring to FIG. 6, an area displayed in white one the plurality of LED arrays (first to fourth LED arrays 120 to 150) shows LED modules emitting light according to driving current being applied by the processor 170, and an area displayed in black on the plurality of LED arrays (first to fourth LED arrays 120 to 150) show LED modules not emitting light according to driving current not being applied by the processor 170. The above may be identically applied below in FIG. 7 to FIG. 11.

Then, the processor 170 may apply driving current to the LED modules disposed in a vertical direction based on the LED modules disposed at the center. Specifically, the processor 170 may simultaneously apply driving current to LED modules of a pre-set number disposed toward an upper side direction and LED modules of a pre-set number disposed toward a lower side direction based on the LED modules disposed at the center that are emitting light. Meanwhile, the pre-set number may be determined based on a dimming method. Further, the pre-set number may be set in a same value for each of the first to fourth LED arrays 120 to 150.

Referring back to the example described above, while the three LED modules disposed at the center of each of the first to fourth LED arrays 120 to 150 are in a state emitting light, the processor 170 may simultaneously apply driving current to the three LED modules disposed at an upper side and the three LED modules disposed at a lower side based on the three LED modules disposed at the center.

Meanwhile, the processor 170 may set sizes of driving current applied to the three LED modules disposed at the upper side and the three LED modules disposed at the lower side differently based on the sizes of driving current applied to the three LED modules disposed at the center and the three LED modules disposed at the center. Through the above, in the LED modules which are turned-on, light having colors and brightness values different from one another may be emitted.

Meanwhile, the processor 170 may progressively increase the number of LED modules which are turned-on from among the plurality of LED modules included in each of the first to fourth LED arrays 120 to 150. That is, the processor 170 may increase the LED modules applied with driving current in the vertical direction based on the LED modules disposed at the center. Referring to FIG. 6, the number of LED modules through which light is output (i.e., LED module in the turned-on state) from among the plurality of LED modules included in each of the first to fourth LED arrays 120 to 150 may increase according to time passing.

Further, based on the processor 170 may turn-off, based on the LED modules disposed at both ends, that is, from the LED modules disposed at an uppermost end to the LED modules disposed at a lowermost end of the first to fourth LED arrays 120 to 150 disposed vertically at the first side surface and the second side surface being identified as all turned-on, the processor 170 may turn-off the plurality of LED modules included in the first to fourth LED arrays 120 to 150. That is, the processor may cut off the driving current being applied to the plurality of LED modules included in the first to fourth LED arrays 120 to 150.

Further, the processor 170 may repeatedly drive, when the plurality of LED modules are turned-off, the plurality of LED modules to be sequentially turned-on from the LED modules disposed at the center to the LED modules disposed at both ends based on a second speed and then turned-off.

That is, the processor 170 may apply, after the speaker 100 is turned-on, driving current for the plurality of LED modules to be sequentially emitted based on the first speed when the plurality of LED modules included in each of the first to fourth LED arrays 120 to 150 are initially emitted. Further, after the plurality of LED modules included in each of the first to fourth LED arrays 120 to 150 are turned-off, the processor 170 may apply driving current for the plurality of LED modules to be sequentially emitted based on the second speed.

At this time, according to an embodiment of the disclosure, the first speed may be set faster than the second speed. For example, the processor 170 may apply driving current for two seconds to be spent until emitting light from the LED modules disposed at the center to the LED modules disposed at both ends, which are included in each of the first to fourth LED arrays 120 to 150 at initial emission. Further, the processor 170 may apply, after turning-off the plurality of LED modules in each of the first to fourth LED arrays 120 to 150, driving current for four seconds to be spent until emitting light from the LED modules disposed at the center to the LED modules disposed at both ends, which are included in each of the first to fourth LED arrays 120 to 150.

Meanwhile, the first to fourth LED arrays 120 to 150 may be repeatedly emitted based on the second speed. That is, after the first to fourth LED arrays 120 to 150 are emitted one time based on the first speed, the first to fourth LED arrays 120 to 150 may be repeatedly emitted based on the second speed. At this time, the light emitting method of the plurality of LEDs included in each of the first to fourth LED arrays 120 to 150 may be a method by which the LED modules disposed at the center to the LED modules disposed at both ends of the first to fourth LED arrays 120 to 150 are sequentially turned-on as described above.

Figure 7:
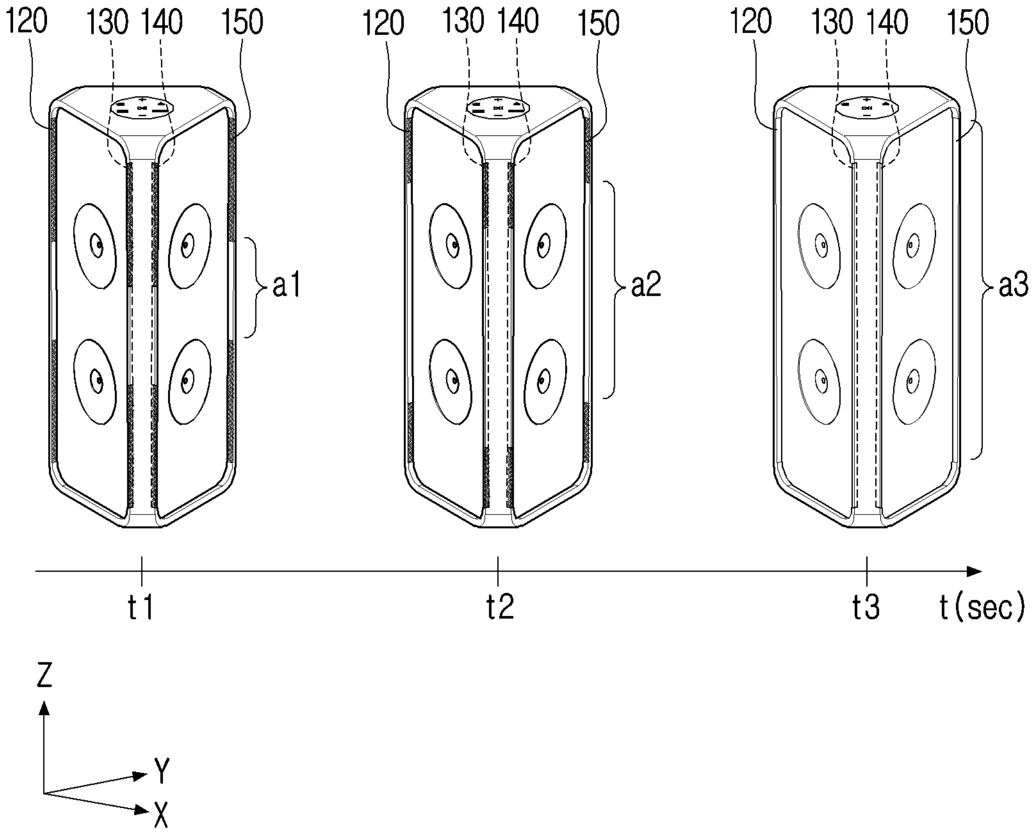
FIG. 7 is an example diagram illustrating a second light emitting method according to an embodiment of the disclosure.

FIG. 7 is an example diagram illustrating a second light emitting method according to an embodiment of the disclosure.

Meanwhile, in an embodiment of the disclosure, the processor 170 may emit, based on a user input for setting a mode of the speaker to a second mode being received while the speaker 100 is in the first mode, the first to fourth LED arrays 120 to 150 based on a second light emitting method corresponding to the second mode.

At this time, the second light emitting method may be a light emitting method by which a process wherein the plurality of LED modules included in each of the first to fourth LED arrays 120 to 150 are sequentially turned-on from the LED modules disposed at the center to the LED modules disposed at both ends based on the first speed, and when the plurality of LED modules are all turned-on, the plurality of LED modules are then all turned-off is repeated.

Specifically, the processor 170 may receive an instruction corresponding to the second mode through the input interface while in a state of the first mode of the speaker 100 after the speaker 100 has been turned-on. At this time, the instruction corresponding to the second mode may be received through the input interface disposed at one side surface of the housing 110 of the speaker 100. To this end, a button for setting the second mode of the speaker may be included in the input interface. Accordingly, the processor 170 may identify, based on the button for setting the second mode being identified as operated, that an instruction for setting in the second mode has been input, and identify a mode of the speaker 100 as the second mode.

Meanwhile, a button for mode setting may be included in the input interface, and if the button for mode setting is identified as operated by a number of times corresponding to the second mode, the processor 170 may identify a mode of the speaker 100 as an instruction for setting in the second mode as having been input. Alternatively, the processor 170 may receive the instruction for setting in the second mode from the external device through a communicating part.

The processor 170 may identify, based on receiving the instruction corresponding to the second mode, a mode of the speaker 100 as the second mode.

Meanwhile, the processor 170 may emit, based on a user input for setting a mode of the speaker 100 to the second mode being received through the input interface even when the mode of the speaker 100 is in another mode other than the first mode, the first to fourth LED arrays 120 to 150 based on the second light emitting method.

Referring to FIG. 7, it may be assumed that the processor 170 received an instruction corresponding to the second mode through the input interface at a t1 time-point while in the first mode of the speaker 100. At this time, the processor 170 may apply driving current to LED modules of a pre-set number disposed at the center of each of the first to fourth LED arrays 120 to 150. Accordingly, the LED modules applied with the driving current from among the plurality of LED modules may be turned-on. Further, light may be output from the center portion of each of the first to fourth LED arrays 120 to 150 included in the speaker 100.

Referring back to FIG. 7, the processor 170 may apply during current to each of the LED modules of the pre-set number vertically adjacent with the LED modules disposed at the center which are emitting light (or turned-on) within the first to fourth LED arrays 120 to 150 at a t2 time-point. Specifically, the processor 170 may apply driving current to another LED module adjacent with the LED modules disposed at the center while maintaining the applying of driving current to the LED modules disposed at the center. Referring to FIG. 7, an area a2 from which light is emitted on the first to fourth LED arrays 120 to 150 of the speaker at the t2 time-point may be increased more than an area a1 from which light is emitted at the t1 time-point.

Referring back to FIG. 7, the processor 170 may apply driving current to each of the LED modules of the pre-set number disposed at both ends within the first to fourth LED arrays 120 to 150 at a t3 time-point. Specifically, the processor 170 may apply driving current to the LED modules disposed at both ends which are in an off-state while maintaining the applying of driving current for the plurality of LED modules which are emitting light within the first to fourth LED arrays 120 to 150. Thereby, the plurality of LED modules included in each of the first to fourth LED arrays 120 to 150 may be all turned-on.

Referring to FIG. 7, an area a3 from which light is emitted on the first to fourth LED arrays 120 to 150 of the speaker 100 at the t3 time-point may be increased more than the area a1 from which light is emitted from the t1 time-point and the area a2 from which light is emitted at the t2 time-point.

As described, based on the processor 170 sequentially applying driving current to the LED modules disposed at the center to the LED modules disposed at both ends from among the plurality of LED modules included in each of the first to fourth LED arrays 120 to 150, there may be an effect such as light on the speaker 100 spreading out in a vertical direction from the center of the speaker 100.

Meanwhile, every time driving current is applied to a new LED module from among the plurality of LED modules, a value of the driving current applied to the LED module emitting light may be changed. For example, it may be assumed that a block including three LED modules disposed at the center on the first to fourth LED arrays is a first block, a block including three LED modules adjacent with the first block toward an upper direction is a second block, and a block including three LED modules adjacent with the first block toward a lower direction is a third block. At this time, the processor 170 may change, if a level 5 driving current was applied to the three LED modules included in the first block, a level of driving current applied to the three LED modules included in the first block when applying driving current to the three LED modules included in each of the second and third blocks thereafter.

That is, the level of driving current applied to the three LED modules included in each of the second and third blocks may be set to 5, and the level of driving current applied to the three LED modules included in the first block may be changed to 4. Thereby, brightness values and color values of the three LED modules included in the first block and the three LED modules included in each of the second and third blocks may be different. Meanwhile, the processor 170 may change the value of the driving current based on image data.

Meanwhile, according to the second light emitting method, the processor 170 may apply driving current for the first to fourth LED arrays 120 to 150 to repeatedly emit light based on the first speed. Referring back to the above-describe example, the driving current may be applied for two seconds to be spent until emitting light from the LED modules disposed at the center to the LED modules disposed at both ends from among the plurality of LED modules included in each of the first to fourth LED arrays 120 to 150. Further, in this case, the processor 170 may control, by periodically applying the driving current, the first to fourth LED arrays 120 to 150 to repeatedly emit light.

Figure 8:
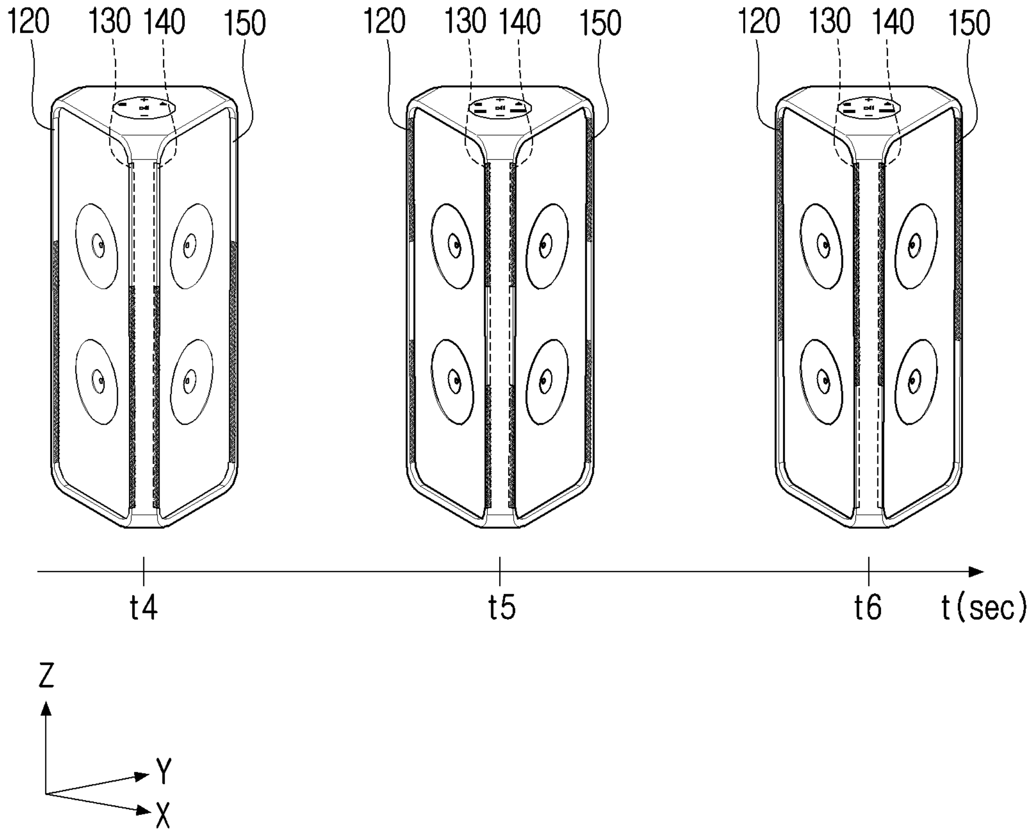
FIG. 8 is an example diagram illustrating a third light emitting method according to an embodiment of the disclosure.

FIG. 8 is an example diagram illustrating a third light emitting method according to an embodiment of the disclosure.

In addition, according to an embodiment of the disclosure, the processor 170 may emit, based on a user input for setting a mode of the speaker 100 to a third mode being received while the speaker 100 is in the first mode, the first to fourth LED arrays 120 to 150 based on a third light emitting method corresponding to the third mode.

Here, a first end may be an area positioned at an uppermost side in the first to fourth LED arrays 120 to 150 disposed in the vertical direction. Meanwhile, a second end may be an area positioned at a lowermost side in the first to fourth LED arrays 120 to 150 disposed in the vertical direction.

At this time, the third light emitting method may be a light emitting method by which a process wherein the plurality of LED modules included in each of the first to fourth LED arrays 120 to 150 are sequentially turned-on from LED modules disposed at the first end to LED modules disposed at the second end based on the first speed and are then turned-off is repeated Specifically, the processor 170 may receive an instruction corresponding to the third mode through the input interface in the first mode state of the speaker after the speaker 100 has been turned-on. At this time, the instruction corresponding to the third mode may be received through a button setting the third mode included in the input interface which is disposed at one side surface of the housing 110 of the speaker 100. Alternatively, based on the button for mode setting included in the input interface is operated by a number of times corresponding to the third mode, an instruction corresponding to the third mode may be received. Alternatively, an instruction corresponding to the third mode may be received from an external device through the communicating part. Because the above has been described in detail with respect to the second mode, descriptions thereof will be omitted.

The processor 170 may identify, based on receiving an instruction corresponding to the third mode, a mode of the speaker 100 as the third mode.

Meanwhile, the processor 170 may emit, based on a user input for setting a mode of the speaker 100 to the third mode being received through the input interface even when the mode of the speaker 100 is in the second mode (or another mode other than the first mode) and not the first mode, the first to fourth LED arrays 120 to 150 based on the third light emitting method.

Further, the processor 170 may first apply driving current to the LED modules of the pre-set number disposed at the first end from among the plurality of LED modules included in each of the first to fourth LED arrays 120 to 150.

Further, the processor 170 may apply driving current to another LED module positioned at a lower side of the LED modules of the pre-set number disposed at the first end while maintaining the applying of the driving current for the LED modules of the pre-set number disposed at the first end which are included in each of the first to fourth LED arrays 120 to 150. At this time, a number of another LED modules may also match with the pre-set number. Further, the processor 170 may cease applying driving current to the LED modules of the pre-set number disposed at the first end. Thereby, the LED modules of the pre-set number disposed at the first end which were emitting light may be turned-off.

Specifically, referring to FIG. 8, it may be assumed that the processor 170 received an instruction corresponding to the third mode through the input interface while in the first mode state of the speaker at a t4 time-point. At this time, the processor 170 may apply driving current to the LED modules of the pre-set number disposed at the uppermost side corresponding to the first end of the first to fourth LED arrays 120 to 150. Accordingly, the LED module applied with the driving current may be turned-on, and the turned-on LED module may output light.

Then, the processor 170 may apply driving current to LED modules of the pre-set number positioned below the LED modules emitting light disposed at the first end of the first to fourth LED arrays 120 to 150 at a t5 time-point. Further, the applied driving current may be cut off for the LED modules disposed at the first end. Accordingly, at the t5 time-point, the LED modules of the pre-set number disposed at the first end of the first to fourth LED arrays 120 to 150 may be turned-off, and the LED modules disposed at the center from among the plurality of LED modules disposed in the first to fourth LED arrays 120 to 150 may be turned-on. Accordingly, the LED modules disposed at the center from among the plurality of LED modules disposed in the first to fourth LED arrays 120 to 150 may emit light.

Meanwhile, the processor 170 may reduce the value of driving current being applied for the LED modules disposed at the first end, and set for the brightness value of the LED modules disposed at the first end to be smaller than the brightness value of the LED modules disposed at the center. Accordingly, at the t5 time-point, the LED modules disposed at the center from among the plurality of LED modules disposed in the first to fourth LED arrays 120 to 150 may output light more brighter than the LED modules disposed at the first end.

Then, the processor 170 may apply driving current to LED modules of the pre-set number positioned below the LED modules emitting light disposed at the center of the first to fourth LED arrays 120 to 150 at a t6 time-point. That is, the processor 170 may apply driving current to the LED modules of the pre-set number disposed at the lowermost side corresponding to the second end of the first to fourth LED arrays 120 to 150. Then, the processor 170 may cease applying the driving current to the LED modules which were emitting light disposed at the center. Accordingly, at the t6 time-point, the LED modules of the pre-set number disposed at the center of the first to fourth LED arrays 120 to 150 may be turned-off, and the LED modules disposed at the second end in the first to fourth LED arrays 120 to 150 may be turned-on. Accordingly, the LED modules disposed at the lowermost side from among the plurality of LED modules disposed in the first to fourth LED arrays 120 to 150 may emit light.

Meanwhile, the processor 170 may reduce the value of driving current being applied for the LED modules disposed at the center, and set for the brightness value of the LED modules disposed at the first end to be smaller than the brightness value of the LED modules disposed at the second end. Accordingly, at the t6 time-point, the LED modules disposed at the second end from among the plurality of LED modules included in the first to fourth LED arrays 120 to 150 may output light more brighter than the LED modules disposed at the center.

Meanwhile, in an embodiment of the disclosure described above, the processor 170 has been described as cutting off driving current to the LED modules which are in an on state after applying driving current to LED modules which are in the off state, but is not limited thereto. That is, the processor 170 may apply driving current to the LED modules which are in the off state after cutting off driving current to the LED modules which are in the on state.

Meanwhile, the processor 170 may sequentially emit the plurality of LED modules included in each of the first to fourth LED arrays 120 to 150 from the LED modules disposed at the first end to the LED modules disposed at the second end.

Specifically, compared to a time spent from after when the LED modules disposed at the first end are turned-on to until the LED modules disposed at the second end are turned-on, a value of a length of the first LED array 120 (or, the second LED array 130, the third LED array 140, the fourth LED array 150) may be a first value corresponding to the first speed. Referring back to the above-described example, the processor 170 may control the driving current being applied to the first to fourth LED arrays 120 to 150 for a time of two seconds to be spent until emitting light from after the LED modules disposed at the front end are emitted to until the LED modules disposed at the second end are emitted from among the plurality of LED modules included in each of the first to fourth LED arrays 120 to 150.

Meanwhile, based on the processor 170 emitting the first to fourth LED arrays 120 to 150 by repeating according to the third light emitting method, there may be a visual effect of light output from the speaker 100 repeatedly falling from the top to bottom on the first to fourth LED arrays 120 to 150.

Meanwhile, according to another embodiment of the disclosure, the processor 170 may sequentially turn-on the plurality of LED modules included in each of the first to fourth LED arrays 120 to 150 from the LED modules disposed at the second end to the LED modules disposed at the first end based on the first speed and then turn-off the same. The above may be a light emitting method set such that a light emitting direction and a light emitting order of the third light emitting method described above are in opposite.

Meanwhile, according to another embodiment of the disclosure, the processor may change the light emitting direction and order of the third light emitting method for every pre-set period. Specifically, the processor 170 may emit, for a first period, the plurality of LED modules included in each of the first to fourth LED arrays 120 to 150 to be sequentially turned-on from the LED modules disposed at the first end to the LED modules disposed at the second end based on the first speed and then turned-off. Further, the processor 170 may emit, for a second period, the plurality of LED modules included in each of the first to fourth LED arrays 120 to 150 to be sequentially turned-on from the LED modules disposed at the second end to the LED modules disposed at the first end based on the first speed and then turned-off.

Figure 9:
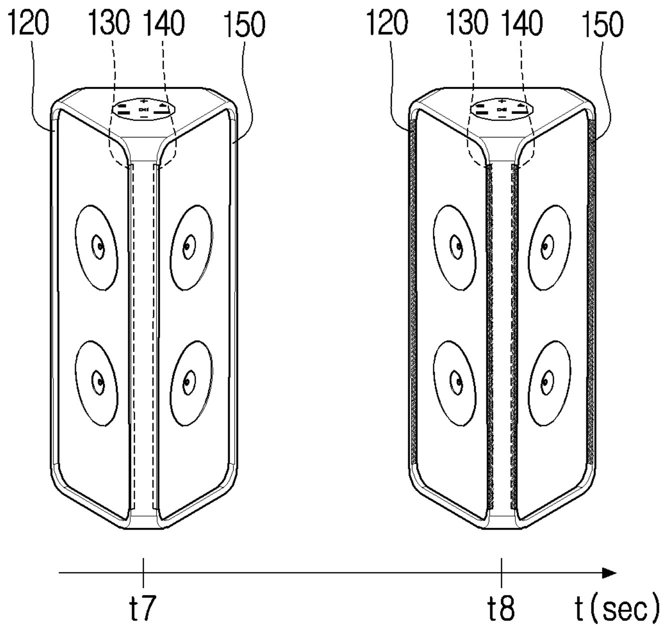
FIG. 9 is an example diagram illustrating a fourth light emitting method according to an embodiment of the disclosure.

FIG. 9 is an example diagram illustrating a fourth light emitting method according to an embodiment of the disclosure.

According to an embodiment of the disclosure, the processor 170 may emit, based on a user input for setting a mode of the speaker 100 to a fourth mode being received while the speaker 100 is in the first mode, the first to fourth LED arrays 120 to 150 based on a fourth light emitting method corresponding to the fourth mode.

At this time, the fourth light emitting method may be a light emitting method by which a process wherein the plurality of LED modules included in each of the first to fourth LED arrays are simultaneously turned-on and are then simultaneously turned-off is repeated.

Specifically, the processor 170 may receive an instruction corresponding to the fourth mode through the input interface while in the first mode state of the speaker 100 after the speaker 100 has been turned-on. At this time, the instruction corresponding to the fourth mode may be received through a button for setting the fourth mode included in the input interface which is disposed at one side surface of the housing 110 of the speaker 100. Alternatively, an instruction corresponding to the fourth mode may be received according to a button for mode setting included in the input interface being operated by a number of times corresponding to the fourth mode. Alternatively, an instruction corresponding to the fourth mode may be received from an external device through the communicating part. With respect to the above, because detailed descriptions associated with the second mode have been described, descriptions thereof will be omitted.

The processor 170 may identify, based on receiving an instruction corresponding to the fourth mode, a mode of the speaker 100 as the fourth mode.

Meanwhile, the processor 170 may emit, based on a user input for setting a mode of the speaker 100 to the fourth mode being received through the input interface even when the mode of the speaker 100 is in the second mode (or another mode other than the first mode) other than the first mode, the first to fourth LED arrays 120 to 150 based on the fourth light emitting method.

Further, the processor 170 may emit the first to fourth LED arrays 120 to 150 based on the fourth light emitting method which is a light emitting method that corresponds to the fourth mode.

Specifically, referring to FIG. 9, the processor 170 may apply, based on a mode of the speaker 100 being identified as in the fourth mode at the t7 time-point, driving current to all of the plurality of LED modules included in each of the first to fourth LED arrays 120 to 150. Accordingly, the plurality of LED modules included in each of the first to fourth LED arrays 120 to 150 may all be turned-on by the applied driving current. Accordingly the first to fourth LED arrays 120 to 150 may all be emitted. At this time, the size of the driving current applied to each of the plurality of LED modules included in the first to fourth LED arrays 120 to 150 may be set to a same value.

Further, the processor 170 may cut off, at a t8 time-point which is past the pre-set time, the driving current applied to all of the plurality of LED modules included in each of the first to fourth LED arrays 120 to 150. Accordingly, the plurality of LED modules included in each of the first to fourth LED arrays 120 to 150 may all be turned-off. Accordingly, the first to fourth LED arrays 120 to 150 may all stop emitting light.

The processor 170 may repeat the above-described light emitting process for every pre-set period. For example, if driving current is applied to all of the first to fourth LED arrays 120 to 150, and 0.5 seconds are spent after turning-on all the LED modules included in the first to fourth LED arrays 120 to 150, all the LED modules included in the first to fourth LED arrays 120 to 150 may be turned-off. Further, after 0.5 seconds are spent again, driving current may be applied again to all the LED modules included in the first to fourth LED arrays 120 to 150, and all the LED modules may be turned-on.

Meanwhile, the processor 170 may set the driving current for light colors output from the first to fourth LED arrays 120 to 150 to be the same.

In addition, the processor 170 may set the driving current for the light colors to be changed every time all the plurality of LED modules included in each of the first to fourth LED arrays 120 to 150 are turned-on. For example, the processor 170 may apply, based on all the plurality of LED modules included in each of the first to fourth LED arrays 120 to 150 being initially turned-on, first driving current for light of a first color to be output. Then, the processor 170 may apply, based on all the plurality of LED modules included in each of the first to fourth LED arrays 120 to 150 being turned-off and are then turned-on again, second driving current for light of a second color to be output.

Meanwhile, based on the processor 170 emitting the first to fourth LED arrays 120 to 150 by repeating according to the fourth light emitting method, there may be a visual effect such as light output from the speaker 100 periodically blinking.

Figure 10:
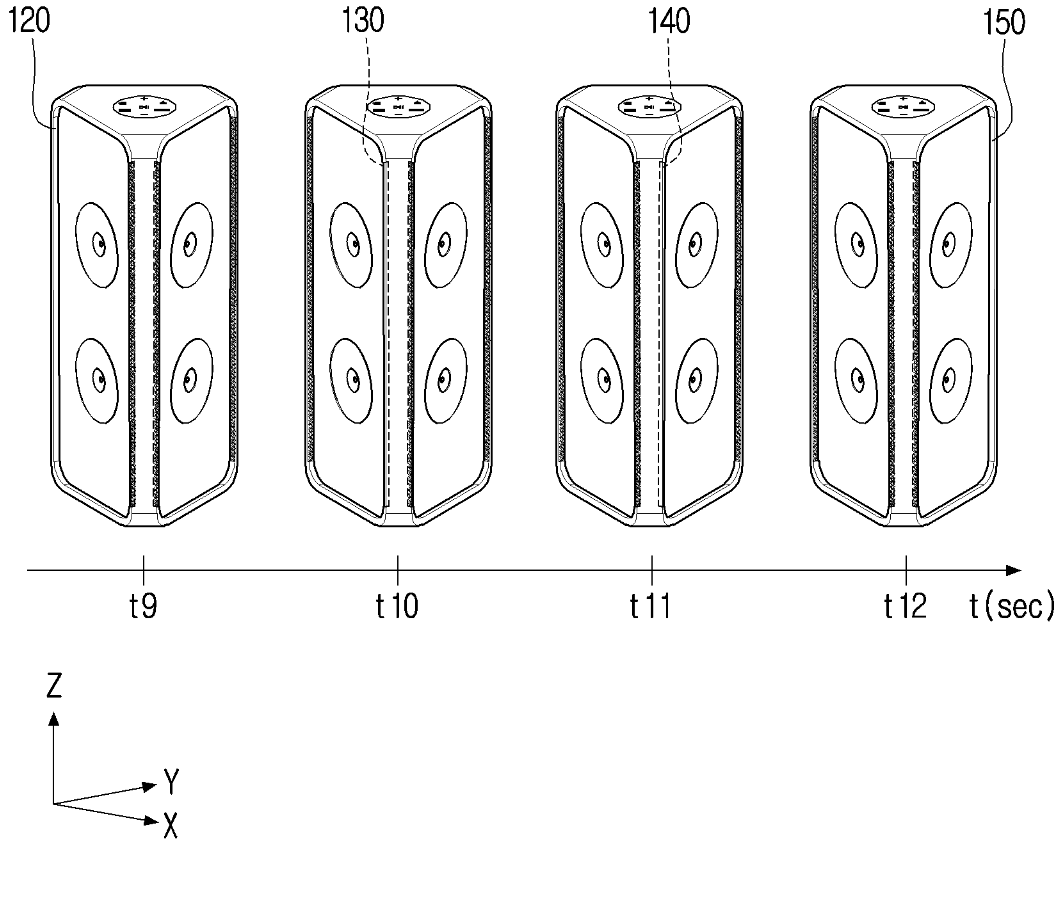
FIG. 10 is an example diagram illustrating a fifth light emitting method according to an embodiment of the disclosure.

FIG. 10 is an example diagram illustrating a fifth light emitting method according to an embodiment of the disclosure.

According to an embodiment of the disclosure, the processor 170 may emit, based on a user input for setting a mode of the speaker 100 to a fifth mode being received while the speaker 100 is in the first mode, the first to fourth LED arrays 120 to 150 based on a fifth light emitting method corresponding to the fifth mode.

At this time, the fifth light emitting method may be a light emitting method by which a process wherein the first to fourth LED arrays 120 to 150 are sequentially emitted and are then turned-off is repeated.

Specifically, the processor 170 may receive an instruction corresponding to the fifth mode through the input interface in the first mode state of the speaker 100 after the speaker 100 has been turned on. At this time, the instruction corresponding to the fifth mode may be received through a button for setting the fifth mode included in the input interface which is disposed at one side surface of the housing 110 of the speaker 100. Alternatively, an instruction corresponding to the fifth mode may be received according to the button for mode setting included in the input interface being operated by a number of times corresponding to the fifth mode. Alternatively, an instruction corresponding to the fifth mode may be received from an external device through the communicating part. With respect to the above, because detailed descriptions associated with the second mode have been described, descriptions thereof will be omitted.

Meanwhile, the processor 170 may emit, based on a user input for setting a mode of the speaker 100 to the fifth mode being received through the input interface even when the mode of the speaker 100 is in the second mode (or another mode other than the first mode) and not the first mode, the first to fourth LED arrays 120 to 150 based on the fifth light emitting method.

The processor 170 may identify, based on receiving an instruction corresponding to the fifth mode, the mode of the speaker 100 as the fifth mode.

Further, the processor 170 may emit the first to fourth LED arrays 120 to 150 based on the fifth light emitting method, which is the light emitting method corresponding to the fifth mode.

Specifically, referring to FIG. 10, the processor 170 may apply, based on a mode of the speaker 100 being identified as in the fifth mode at a t9 time-point, driving current to the plurality of LED modules included in the first LED array 120 from among the first to fourth LED arrays 120 to 150. Accordingly, only the plurality of LED modules applied with the driving current and included in the first LED array 120 may be turned-on. Accordingly the first to fourth LED arrays 120 to 150 may all be emitted. That is, the plurality of LED modules included in each of the second to fourth LED arrays 130 to 150 may all be turned-off.

Further, the processor 170 may cut off, at a t10 time-point which is past the pre-set time, the driving current applied to the plurality of LED modules included in the first LED array 120. Then, the processor 170 may apply driving current to the plurality of LED modules included in the second LED array 130 from among the first to fourth LED arrays 120 to 150. Accordingly, only the plurality of LED modules applied with the driving current and included in the second LED array 130 may be turned-on. That is, the plurality of LED modules included in each of the first, third, and fourth LED arrays 120, 140, and 150 may all be turned-off.

Further, the processor 170 may cut off, at a t11 time-point which is past the pre-set time, the driving current applied to the plurality of LED modules included in the second LED array 130. Then, the processor 170 may apply driving current to the plurality of LED modules included in the third LED array 140 from among the first to fourth LED arrays 120 to 150. Accordingly, only the plurality of LED modules applied with the driving current and included in the third LED array 140 may be turned-on. That is, the plurality of LED modules included in each of the first, second, and fourth LED arrays 120, 130, and 150 may all be turned-off.

Further, the processor 170 may cut off, at a t12 time-point which is past the pre-set time, the driving current applied to the plurality of LED modules included in the third LED array 140. Then, the processor 170 may apply driving current to the plurality of LED modules included in the fourth LED array 150 from among the first to fourth LED arrays 120 to 150. Accordingly, only the plurality of LED modules applied with the driving current and included in the fourth LED array 150 may be turned-on. That is, the plurality of LED modules included in each of the first to third LED arrays 120 to 140 may all be turned-off.

Meanwhile, the processor 170 may repeatedly perform the above-described process. Accordingly, based on the processor 170 emitting the first to fourth LED arrays 120 to 150 by repeating according to the fifth light emitting method, a visual effect such as light output from the speaker 100 rotating based on the speaker 100 may be provided to the user.

Meanwhile, the processor may emit, after emitting the first LED array 120 based on the fourth speed, the second LED array 130 after turning-off the first LED array 120. At this time, the fourth speed may be set faster than the first speed and slower than the third speed. For example, the processor 170 may emit, after one second is passed after emitting the first LED array 120, the second LED array 130 after turning-off the first LED array 120.

Figure 11:
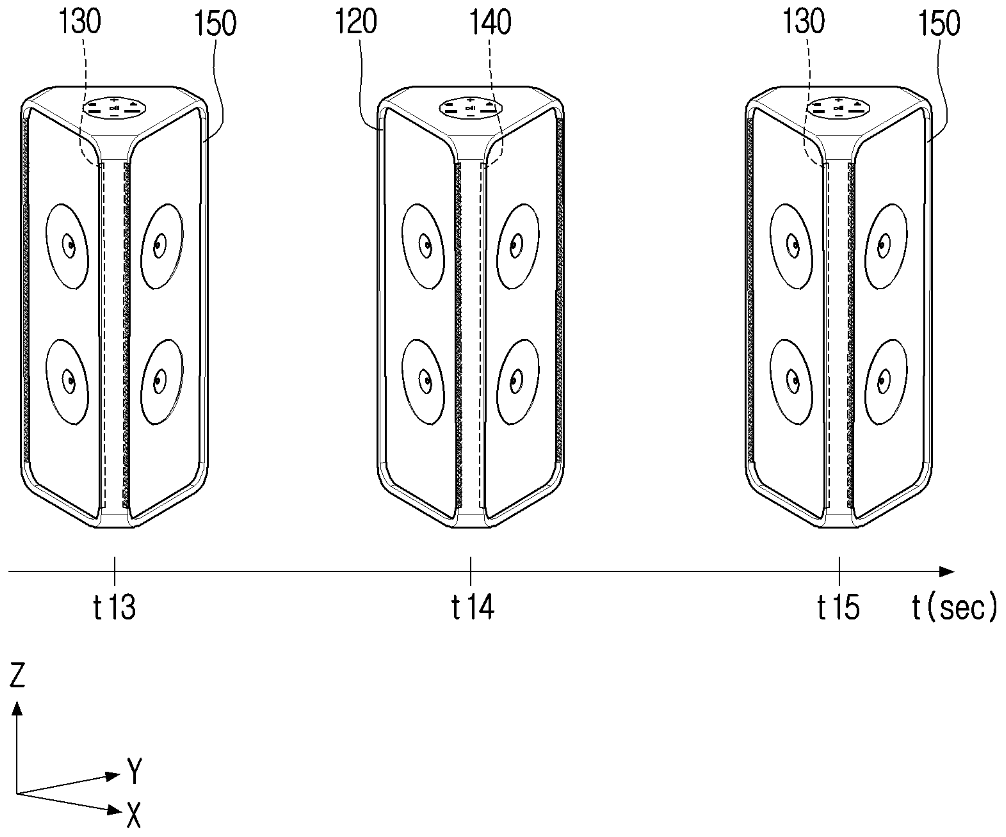
FIG. 11 is an example diagram illustrating a sixth light emitting method according to an embodiment of the disclosure.

FIG. 11 is an example diagram illustrating a sixth light emitting method according to an embodiment of the disclosure.

Meanwhile, in another embodiment of the disclosure, the processor 170 may emit, based on a user input for setting a mode of the speaker 100 to a fifth mode while the speaker 100 is in the first mode, the first to fourth LED arrays 120 to 150 based on a sixth light emitting method corresponding to the fifth mode.

At this time, the sixth light emitting method may be a light emitting method by which a process wherein the second and fourth LED arrays 130 and 150 are emitted when the first and third LED arrays 120 and 140 are emitted and are then turned-off is repeated.

First, the processor 170 may identify, based on receiving an instruction corresponding to the fifth mode, the mode of the speaker 100 as the fifth mode. Because a process of identifying the mode of the speaker as the fifth mode by the processor 170 has been described above, and description thereof will be omitted.

Further, the processor 170 may emit the first to fourth LED arrays 120 to 150 based on the sixth light emitting method, which is the light emitting method corresponding to the fifth mode.

Specifically, referring to FIG. 11, the processor 170 may apply, based on the mode of the speaker 100 being identified as in the fifth mode at a t13 time-point, the driving current to the plurality of LED modules included in the first and third LED arrays 120 and 140 from among the first to fourth LED arrays 120 to 150. Accordingly, only the plurality of LED modules applied with the driving current and included in each of the first and third LED arrays 120 and 140 may be turned-on. That is, the plurality of LED modules included in each of the second and fourth LED arrays 130 and 150 may all be turned-off.

Further, the processor 170 may cut off, at a t14 time-point which is past the pre-set time, driving current applied to the plurality of LED modules included in each of the first and third LED arrays 120 and 140. Then, the processor 170 may apply driving current to the plurality of LED modules included in each of the second and fourth LED arrays 130 and 150 from among the first to fourth LED arrays 120 to 150. Accordingly, only the plurality of LED modules applied with the driving current and included in the second and fourth LED arrays 130 and 150 may be turned-on. That is, the plurality of LED modules included in each of the first to third LED arrays 120 to 140 may all be turned-off.

Further, the processor 170 may cut off, at a t15 time-point which is past the pre-set time, driving current applied to the plurality of LED modules included in each of the second and fourth LED arrays 130 and 150. Then, the processor 170 may apply the driving current again to the plurality of LED modules included in the first and third LED arrays 120 and 140 from among the first to fourth LED arrays 120 to 150. Accordingly, only the plurality of LED modules applied with the driving current and included in the first and third LED arrays 120 and 140 may be turned-on. That is, the plurality of LED modules included in each of the second and fourth LED arrays 130 and 150 may all be turned-off.

Meanwhile, the processor 170 may repeatedly perform the above-described process. Accordingly, based on the processor 170 emitting the first to fourth LED arrays 120 to 150 by repeating according to the sixth light emitting method, a visual effect such as light output from the speaker 100 moving based on the speaker 100 may be provided to the user.

Meanwhile, the processor 170 may emit, after emitting the first and third LED arrays 120 and 140 based on the fourth speed, the second and fourth LED arrays 130 and 150 after turning-off the first and third LED arrays 120 and 140. Referring back to the above-described example, the processor 170 may emit, after one second is passed after emitting the first and third LED arrays 120 and 140, the second and fourth LED arrays 130 and 150 after turning-off the first and third LED arrays 120 and 140.

Meanwhile, based on the mode of the speaker 100 being in the fifth mode, the processor 170 has been described as selectively applying the fifth light emitting method or the sixth light emitting method, but is not limited thereto. That is, the processor 170 may identify, based on a user input for setting the fifth mode being input, the mode of the speaker 100 as the fifth mode, and emit the first to fourth LED arrays 120 to 150 by applying both the fifth light emitting method and the sixth light emitting method. At this time, the processor 170 may randomly set an application order of the fifth light emitting method and the sixth light emitting method.

Meanwhile, according to an embodiment of the disclosure, the processor 170 may apply all the second to fourth light emitting methods described above in one mode. For example, the processor 170 may emit, based on a user input for setting the sixth mode being received, the first to fourth LED arrays 120 to 150 by sequentially applying the second to fourth light emitting method in random order.

Meanwhile, the processor 170 may set a time period in which the first to sixth light emitting methods are repeated based on sounds output through the sound outputter 160.

Specifically, according to an embodiment of the disclosure, the speaker 100 may further include a microphone. At this time, the processor 170 may identify, based on sounds obtained through the microphone, a beat per minute (BPM) of a sound, and set a period time corresponding to the sound output from the speaker based on the identified BPM. Further, the processor 170 may repeatedly emit the first to fourth LED arrays 120 to 150 based on the light emitting method corresponding to the mode of the speaker 100 according to a set period time.

More specifically, the processor 170 may obtain sounds output through the sound outputter 160 through the microphone. Further, the processor 170 may analyze the obtained sound, and identify the BPM of the sound. Further, a time period corresponding to the identified BPM may be set. For example, if the BPM is identified with a high value, the processor 170 may identify the sound output through the sound outputter 160 as of a fast tempo. Further, the processor 170 may set a light emitting period of the LED modules to be short so as to corresponding to the fast tempo of the identified sound. Conversely, if the BPM is identified with a low value, the processor 170 may identify the sound output through the sound outputter 160 as of a slow tempo. Further, the processor 170 may set a light emitting period of the LED modules to be long so as to corresponding to the slow tempo of the identified sound. Meanwhile, the processor 170 may repeatedly apply driving current to the plurality of LED modules included in each of the first to fourth LED arrays 120 to 150 by repeating according to the set time period. Because the above has been described above, descriptions thereof will be omitted.

Figure 12:
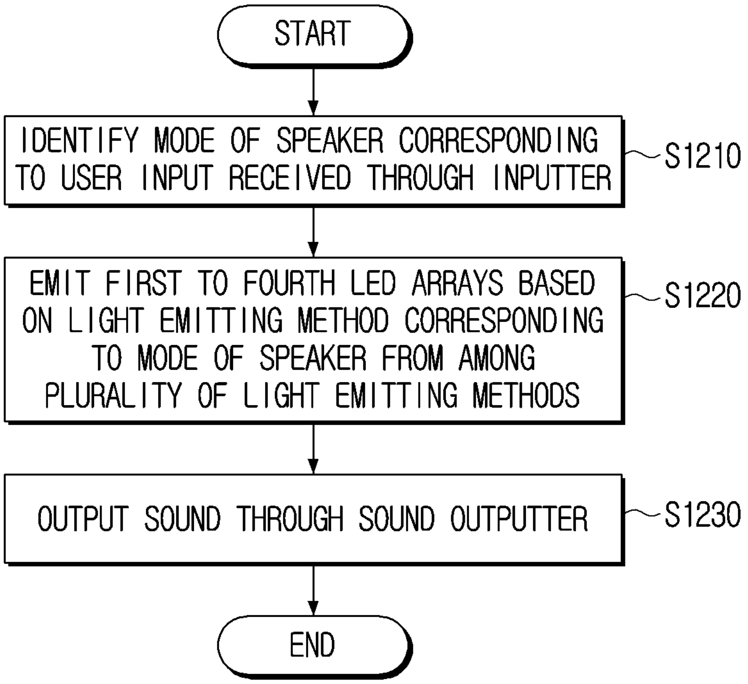
FIG. 12 is a flowchart illustrating schematically a method of controlling a speaker according to an embodiment of the disclosure.

FIG. 12 is a flowchart illustrating schematically a control method of a speaker according to an embodiment of the disclosure.

Referring to FIG. 12, the processor 170 may first identify a mode of the speaker 100 corresponding to the user input received through an inputter (S1210). For example, the processor 170 may receive a user input for the mode setting through the input interface or the communicating part disposed at one side surface of the speaker 100. Then, the processor 170 may identify a mode of the speaker 100 corresponding to the user input. For example, if a button corresponding to the plurality of modes is included in the input interface, the processor 170 may identify a mode of the speaker 100 corresponding to the button operated by the user.

Meanwhile, a mode of the speaker may indicate a driving type of the speaker 100, and for example, may relate to a driving method for the plurality of LED arrays (e.g., the light emitting method of the first to fourth LED arrays 120 to 150) included in the speaker 100. Meanwhile, the mode for the speaker 100 may be in plurality, and each of the plurality of modes may be set to correspond to each of the plurality of driving types of the speaker 100.

Then, the processor 170 may emit the first to fourth LED arrays 120 to 150 based on the light emitting method corresponding to the mode of the speaker 100 from among the plurality of light emitting methods (S1220). Specifically, the processor 170 may identify the light emitting method corresponding to the mode of the speaker 100, and obtain image data corresponding to the identified light emitting method from the memory. Further, the processor 170 may control, based on the image data, driving current to adjust the brightness of the plurality of LED modules included in each of the first to fourth LED arrays 120 to 150.

Then, the processor 170 may output sound through the sound outputter 160 (S1230). Specifically, the processor 170 may output sound corresponding to an audio signal stored in the speaker 100 or an audio signal received from an external device (e.g., the user terminal device) connected with the speaker 100 through the sound outputter 160.

Figure 13:
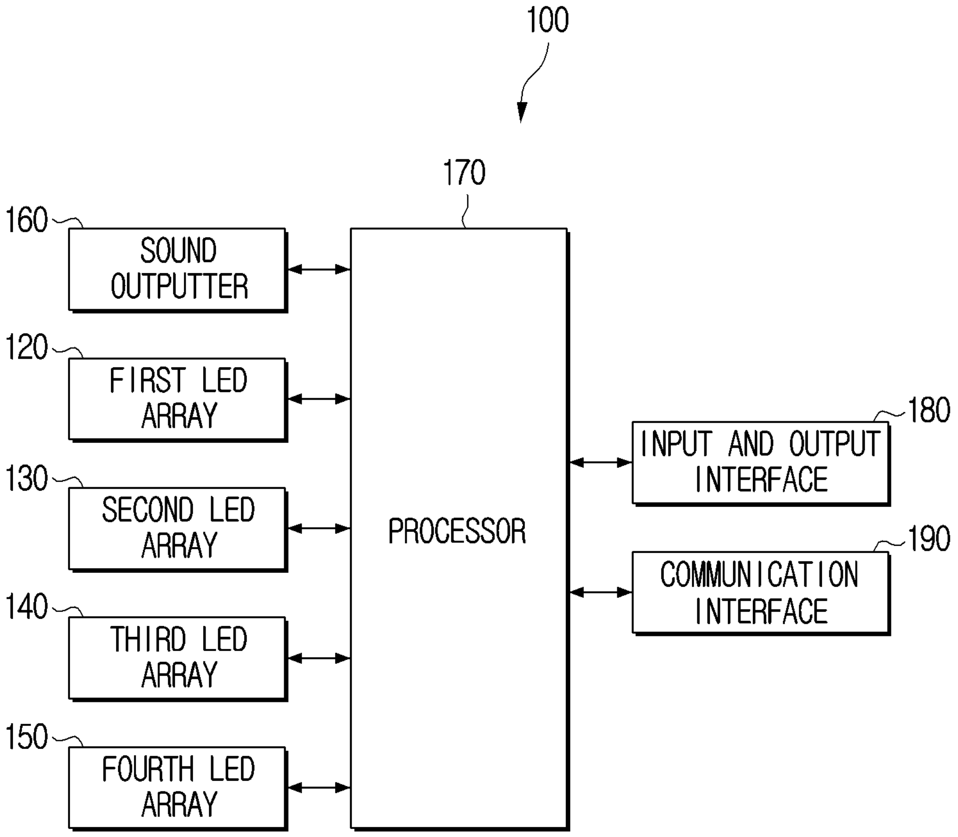
FIG. 13 is a block diagram illustrating in detail a speaker according to an embodiment of the disclosure.

FIG. 13 is a block diagram illustrating in detail a speaker according to an embodiment of the disclosure.

The speaker 100 may include the housing 110, the first LED array 120, the second LED array 130, the third LED array 140, the fourth LED array 150, an input and output interface 180, and a communication interface 190.

Detailed descriptions of configurations that overlap with configurations shown in FIG. 5 from among the configurations shown in FIG. 13 will be omitted.

The input and output interface 180 may be a configuration involved in performing interactions with the user. For example, the input and output interface 180 may include at least one form among a touch sensor, a motion sensor, a button, a jog dial, a switch, or a microphone, but is not limited thereto. Meanwhile, the mode of the speaker may be set or changed through the user input and output interface 180.

The communication interface 190 may input and output data of various types. For example, the communication interface 190 may transmit and receive data of various types with a speaker 100 through communication methods such as, for example, and without limitation, an AP based Wi-Fi (Wi-Fi, wireless LAN network), Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, or the like. Specifically, the processor 170 may receive image data corresponding to the light emitting method from an external server or an external device through the communication interface 190. Alternatively, the processor 170 may receive instructions for the mode setting of the speaker from the external server or the external device through the communication interface 190.

Meanwhile, the speaker 100 may further include a memory. In the memory, image data on the light emitting methods according to each of the modes may be stored. In addition thereto, the memory may be stored with data necessary for the various embodiments of the disclosure. The memory 130 may be implemented in a form of a memory embedded in the speaker 100 according to a data storage use, or in a form of a memory attachable to or detachable from the speaker 100. For example, the data for the driving of the speaker 100 may be stored in the memory embedded in the speaker 100, and data for an expansion function of the speaker 100 may be stored in the memory attachable to or detachable from the speaker 100. Meanwhile, the memory embedded in the speaker 100 may be implemented as at least one from among a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In addition, in the case of the memory attachable to or detachable from the speaker 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., a USB memory) connectable to a USB port, or the like.

Methods according to the various embodiments of the disclosure described above may be implemented in an application form applicable to speakers of the related art.

In addition, the methods according to the various embodiments of the disclosure described above may be implemented with only a software upgrade, or a hardware upgrade for the speaker of the related art which includes the first to fourth LED modules.

In addition, the various embodiments of the disclosure described above may be performed through an embedded provided in the speaker or through at least one external server.

Meanwhile, the various embodiments described above may be implemented in a recordable medium which is readable by computer or a device similar to computer using software, hardware, or the combination of software and hardware. In some cases, the embodiments described herein may be implemented by the processor 170 itself. According to a software implementation, embodiments such as procedures and functions described herein may be implemented with separate software modules. Each of the software modules may perform one or more of the functions and operations described herein Meanwhile, computer instructions for performing processing operations of the speaker 100 according to the various embodiments described above may be stored in a non-transitory computer-readable medium. The computer instructions stored in this non-transitory computer-readable medium may cause a specific device to perform a processing operation in the speaker 100 according to the above-described various embodiments when executed by a processor of the specific device.

The non-transitory computer-readable medium may refer to a medium that stores data semi-permanently rather than storing data for a very short time, such as a register, a cache, a memory, or the like, and is readable by a device. Specific examples of the non-transitory computer-readable medium may include, for example, and without limitation, a compact disc (CD), a digital versatile disc (DVD), a hard disc, a Blu-ray disc, a USB, a memory card, a ROM, and the like.

According to various embodiments of the disclosure, a speaker may differently apply light emitting methods of an LED array according to a mode of the speaker. Accordingly, a user may be provided with both sound output from the speaker and a visual effect associated with the sound, and there may be an effect of enhancing a sense of engagement of the user using the speaker.

In addition, the speaker may reflect light being emitted from the LED arrays by a protrusion pattern included at a side surface of the speaker. Accordingly, the speaker may provide the user with not only a direct lighting effect using the LED arrays, but also an indirect light effect using light reflected by the protrusion patterns.

While the disclosure has been illustrated and described with reference to example embodiments thereof, it will be understood that the embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A speaker, comprising:
a sound outputter;
a housing;
a first LED array disposed in a vertical direction at a left end of a first side surface among a plurality of side surfaces comprised in the housing;
a second LED array disposed in the vertical direction at a right end of the first side surface;
a third LED array disposed in the vertical direction at a left end of a second side surface among the plurality of side surfaces;
a fourth LED array disposed in the vertical direction at a right end of the second side surface; and
at least one processor configured to:
control the first LED array, the second LED array, the third LED array, and the fourth LED array based on a light emitting method corresponding to a mode of the speaker among a plurality of light emitting methods, and
control the sound outputter to output sound,
wherein the first side surface is formed with a protrusion pattern for reflecting light emitted from the first LED array and the second LED array, and
wherein the second side surface is formed with a protrusion pattern for reflecting light emitted from the third LED array and the fourth LED array.

2. The speaker of claim 1,
wherein the at least one processor is further configured to:
based on the speaker being turned-on by a user input, control the first LED array, the second LED array, the third LED array, and the fourth LED array to emit based on a first light emitting method corresponding to a first mode,
wherein the first light emitting method is a light emitting method in which a plurality of LED modules comprised in each of the first LED array, the second LED array, the third LED array, and the fourth LED array are sequentially turned-on from LED modules disposed at a center to LED modules disposed at both ends based on a first speed, and are then turned-off,
based on the plurality of LED modules being turned-off, the plurality of LED modules are sequentially turned-on from the LED modules disposed at the center to the LED modules disposed at the both ends based on a second speed, are then turned-off, and the light emitting method is repeated, and
wherein the first speed is faster than the second speed.

3. The speaker of claim 2,
wherein the at least one processor is further configured to:
based on a user input for setting the mode of the speaker to a second mode being received while the speaker is in the first mode, control the first LED array, the second LED array, the third LED array, and the fourth LED array to emit based on a second light emitting method corresponding to the second mode, and
wherein the second light emitting method is a light emitting method in which the plurality of LED modules comprised in each of the first LED array, the second LED array, the third LED array, and the fourth LED array are sequentially turned-on from the LED modules disposed at the center to the LED modules disposed at the both ends based on the first speed, and based on the plurality of LED modules all being turned-on, the plurality of LED modules are then all turned-off, and the light emitting method is repeated.

4. The speaker of claim 2,
wherein the at least one processor is further configured to:
based on a user input for setting the mode of the speaker to a third mode being received while the speaker is in the first mode, control the first LED array, the second LED array, the third LED array, and the fourth LED array to emit based on a third light emitting method corresponding to the third mode, and
wherein the third light emitting method is a light emitting method in which the plurality of LED modules comprised in each of the first LED array, the second LED array, the third LED array, and the fourth LED array are sequentially turned-on from LED modules disposed at a first end to LED modules disposed at a second end based on the first speed, are then turned-off, and the light emitting method is repeated.

5. The speaker of claim 2,
wherein the at least one processor is further configured to:
based on a user input for setting the mode of the speaker to a fourth mode being received while the speaker is in the first mode, control the first LED array, the second LED array, the third LED array, and the fourth LED array to emit based on a fourth light emitting method corresponding to the fourth mode, and
wherein the fourth light emitting method is a light emitting method in which the plurality of LED modules comprised in each of the first LED array, the second LED array, the third LED array, and the fourth LED array are simultaneously turned-on, are then simultaneously turned-off, and the light emitting method is repeated.

6. The speaker of claim 2, wherein the at least one processor is further configured to:

based on a user input for setting the mode of the speaker to a fifth mode being received while the speaker is in the first mode, control the first LED array, the second LED array, the third LED array, and the fourth LED array to emit based on a fifth light emitting method corresponding to the fifth mode, and wherein the fifth light emitting method is a light emitting method in which the first LED array, the second LED array, the third LED array, and the fourth LED array are sequentially turned-on, are then turned-off, and the light emitting method is repeated.

7. The speaker of claim 2, wherein the at least one processor is further configured to:

based on a user input for setting the mode of the speaker to a sixth mode being received while the speaker is in the first mode, emit the first LED array, the second LED array, the third LED array, and the fourth LED array based on a sixth light emitting method corresponding to the sixth mode, and wherein the sixth light emitting method is a light emitting method in which the second LED array and the fourth LED array are turned-on when the first LED array and the third LED array are turned-on, are then turned-off, and the light emitting method is repeated.

8. The speaker of claim 1, wherein the speaker further comprises a microphone, wherein the at least one processor is further configured to:

based on a sound obtained through the microphone, identify a BPM of the sound, identify a period time based on the identified BPM, and control the first LED array, the second LED array, the third LED array, and the fourth LED array to repeatedly emit based on a light emitting method corresponding to the mode of the speaker according to the identified period time.

9. A method for controlling a speaker, the speaker including: a sound outputter;

a housing;

a first LED array disposed in a vertical direction at a left end of a first side surface among a plurality of side surfaces included the housing;

a second LED array disposed in the vertical direction at a right end of the first side surface;

a third LED array disposed in the vertical direction at a left end of a second side surface among the plurality of side surfaces; and a fourth LED array disposed in the vertical direction at a right end of the second side surface, wherein the first side surface is formed with a protrusion pattern for reflecting light emitted from the first LED array and the second LED array, wherein the second side surface is formed with a protrusion pattern for reflecting light emitted from the third LED array and the fourth LED array, and wherein the method comprises:

emitting the first LED array, the second LED array, the third LED array, and the fourth LED array based on a light emitting method corresponding to a mode of the speaker from among a plurality of light emitting methods; and outputting sound through the sound outputter.

10. The method of claim 9, wherein the emitting comprises:

based on the speaker being turned-on by a user input, emitting the first LED array, the second LED array, the third LED array, and the fourth LED array based on a first light emitting method corresponding to a first mode, wherein the first light emitting method is a light emitting method in which a plurality of LED modules included in each of the first LED array, the second LED array, the third LED array, and the fourth LED array are sequentially turned-on from LED modules disposed at a center to LED modules disposed at both ends based on a first speed, and are then turned-off, based on the plurality of LED modules being turned-off, the plurality of LED modules are sequentially turned-on from the LED modules disposed at the center to the LED modules disposed at the both ends based on a second speed, are then turned-off, and the light emitting method is repeated, and wherein the first speed is faster than the second speed.

11. The method of claim 10, wherein the emitting further comprises:

based on a user input for setting the mode of the speaker to a second mode being received while the speaker is in the first mode, emitting the first LED array, the second LED array, the third LED array, and the fourth LED array based on a second light emitting method corresponding to the second mode, and wherein the second light emitting method is a light emitting method in which the plurality of LED modules included in each of the first LED array, the second LED array, the third LED array, and the fourth LED array are sequentially turned-on from the LED modules disposed at the center to the LED modules disposed at the both ends based on the first speed, and based on the plurality of LED modules all being turned-on, the plurality of LED modules are then all turned-off, and the light emitting method is repeated.

12. The method of claim 10, wherein the emitting further comprises:

based on a user input for setting the mode of the speaker to a third mode being received while the speaker is in the first mode, emitting the first LED array, the second LED array, the third LED array, and the fourth LED array based on a third light emitting method corresponding to the third mode, and wherein the third light emitting method is a light emitting method in which the plurality of LED modules included in each of the first LED array, the second LED array, the third LED array, and the fourth LED array are sequentially turned-on from LED modules disposed at a first end to LED modules disposed at a second end based on the first speed, are then turned-off, and the light emitting method is repeated.

13. The method of claim 10, wherein the emitting further comprises:

based on a user input for setting the mode of the speaker to a fourth mode being received while the speaker is in the first mode, emitting the first LED array, the second LED array, the third LED array, and the fourth LED array based on a fourth light emitting method corresponding to the fourth mode, and wherein the fourth light emitting method is a light emitting method in which the plurality of LED modules included in each of the first LED array, the second LED array, the third LED array, and the fourth LED array are simultaneously turned-on, are then simultaneously turned-off, and the light emitting method is repeated.

14. The method of claim 10, wherein the emitting further comprises:

based on a user input for setting the mode of the speaker to a fifth mode being received while the speaker is in the first mode, emitting the first LED array, the second LED array, the third LED array, and the fourth LED array based on a fifth light emitting method corresponding to the fifth mode, and wherein the fifth light emitting method is a light emitting method in which the first LED array, the second LED array, the third LED array, and the fourth LED array are sequentially turned-on, are then turned-off, and the light emitting method is repeated.

15. The method of claim 10, wherein the emitting further comprises:

based on a user input for setting the mode of the speaker to a sixth mode being received while the speaker is in the first mode, emitting the first LED array, the second LED array, the third LED array, and the fourth LED array based on a sixth light emitting method corresponding to the sixth mode, and wherein the sixth light emitting method is a light emitting method in which the second LED array and the fourth LED array are turned-on when the first LED array and the third LED array are turned-on, are then turned-off, and the light emitting method is repeated.

* * * * *